(12) United States Patent
Bassett

(10) Patent No.: US 9,723,778 B2
(45) Date of Patent: *Aug. 8, 2017

(54) AGRICULTURAL SYSTEM

(71) Applicant: Dawn Equipment Company, Sycamore, IL (US)

(72) Inventor: Joseph D. Bassett, Sycamore, IL (US)

(73) Assignee: Dawn Equipment Company, Sycamore, IL (US)

( * ) Notice: Subject to any disclaimer, the term of this patent is extended or adjusted under 35 U.S.C. 154(b) by 39 days.

This patent is subject to a terminal disclaimer.

(21) Appl. No.: 14/858,171

(22) Filed: Sep. 18, 2015

(65) Prior Publication Data

US 2016/0128265 A1 May 12, 2016

Related U.S. Application Data

(63) Continuation-in-part of application No. 14/593,492, filed on Jan. 9, 2015.

(60) Provisional application No. 62/085,334, filed on Nov. 28, 2014, provisional application No. 62/076,767, filed on Nov. 7, 2014.

(51) Int. Cl.
*A01C 5/06* (2006.01)
*A01C 7/20* (2006.01)

(52) U.S. Cl.
CPC ............... *A01C 7/203* (2013.01); *A01C 5/06* (2013.01)

(58) Field of Classification Search
CPC .. A01C 5/06; A01C 5/00; A01C 7/203; A01C 7/201; A01C 7/20; A01C 7/00
See application file for complete search history.

(56) References Cited

U.S. PATENT DOCUMENTS

| | | |
|---|---|---|
| 114,002 A | 4/1871 | Godfrey |
| 321,906 A | 7/1885 | McCormick |
| 353,491 A | 2/1886 | Wells |
| 523,508 A | 7/1894 | Bauer |
| 736,369 A | 8/1903 | Dynes |
| 803,088 A | 10/1905 | Barker |

(Continued)

FOREIGN PATENT DOCUMENTS

| | | |
|---|---|---|
| BE | 551372 | 10/1956 |
| CA | 530673 | 9/1956 |

(Continued)

OTHER PUBLICATIONS

Case Corporation Brochure, Planters 900 Series Units/Modules Product Information, Aug. 1986 (4 pages).

(Continued)

*Primary Examiner* — Christopher J Novosad
(74) *Attorney, Agent, or Firm* — Nixon Peabody LLP

(57) ABSTRACT

A hydraulic control system for controlling the down force on an agricultural implement comprises a hydraulic cylinder containing a movable ram, a source of pressurized fluid coupled to the hydraulic cylinder on a first side of the ram by a first controllable valve, a fluid sump coupled to the hydraulic cylinder on the first side of the ram by a second controllable valve, and an electrical controller coupled to the valves for opening and closing the valves. The valves may be self-latching valves that remain in an open or closed position until moved to the other position in response to a signal from the controller.

5 Claims, 31 Drawing Sheets

(56) References Cited

U.S. PATENT DOCUMENTS

| | | |
|---|---|---|
| 1,134,462 A | 4/1915 | Kendrick |
| 1,158,023 A | 10/1915 | Beaver |
| 1,247,744 A | 11/1917 | Trimble |
| 1,260,752 A | 3/1918 | Casaday |
| 1,321,040 A | 11/1919 | Hoffman |
| 1,391,593 A | 9/1921 | Sweeting |
| 1,398,668 A | 11/1921 | Bordsen |
| 1,791,462 A | 2/1931 | Bermel |
| 1,844,255 A | 2/1932 | Kaupke |
| 1,901,299 A | 3/1933 | Johnson |
| 1,901,778 A | 3/1933 | Schlag |
| 2,014,334 A | 9/1935 | Johnson |
| 2,058,539 A | 10/1936 | Welty |
| 2,269,051 A | 1/1942 | Cahoy |
| 2,341,143 A | 2/1944 | Herr |
| 2,505,276 A | 4/1950 | Boroski |
| 2,561,763 A | 7/1951 | Waters |
| 2,593,176 A | 4/1952 | Patterson |
| 2,596,527 A | 5/1952 | Bushong |
| 2,611,306 A | 9/1952 | Strehlow |
| 2,612,827 A | 10/1952 | Baggette |
| 2,664,040 A | 12/1953 | Beard |
| 2,691,353 A | 10/1954 | Secondo |
| 2,692,544 A | 10/1954 | Jessup |
| 2,715,286 A | 8/1955 | Saveson |
| 2,754,622 A | 7/1956 | Rohnert |
| 2,771,044 A | 11/1956 | Putifer |
| 2,773,343 A | 12/1956 | Oppel |
| 2,777,373 A | 1/1957 | Pursche |
| 2,799,234 A | 7/1957 | Chancey |
| 2,805,574 A | 9/1957 | Jackson, Jr. |
| 2,925,872 A | 2/1960 | Darnell |
| 2,960,358 A | 11/1960 | Christison |
| 3,010,744 A | 11/1961 | Hollis |
| 3,014,547 A | 12/1961 | Van der Lely |
| 3,038,424 A | 6/1962 | Johnson |
| 3,042,121 A | 7/1962 | Broetzman |
| 3,057,092 A | 10/1962 | Curlett |
| 3,058,243 A | 10/1962 | McGee |
| 3,065,879 A | 11/1962 | Jennings |
| 3,110,973 A | 11/1963 | Reynolds |
| 3,122,901 A | 3/1964 | Thompson |
| 3,123,152 A | 3/1964 | Biskis |
| 3,188,989 A | 6/1965 | Johnston |
| 3,213,514 A | 10/1965 | Evans |
| 3,250,109 A | 5/1966 | Spyridakis |
| 3,314,278 A | 4/1967 | Bergman |
| 3,319,589 A | 5/1967 | Moran |
| 3,351,139 A | 11/1967 | Schmitz |
| 3,355,930 A | 12/1967 | Fedorov |
| 3,368,788 A | 2/1968 | Padula |
| 3,368,789 A | 2/1968 | Martin |
| 3,370,450 A | 2/1968 | Scheucher |
| 3,420,273 A | 1/1969 | Greer |
| 3,447,495 A | 6/1969 | Miller |
| 3,539,020 A | 11/1970 | Andersson |
| 3,543,603 A | 12/1970 | Gley |
| 3,561,541 A | 2/1971 | Woelfel |
| 3,576,098 A | 4/1971 | Brewer |
| 3,581,685 A | 6/1971 | Taylor |
| 3,593,720 A | 7/1971 | Botterill |
| D221,461 S | 8/1971 | Hagenstad |
| 3,606,745 A | 9/1971 | Girodat |
| 3,635,495 A | 1/1972 | Orendorff |
| 3,650,334 A | 3/1972 | Hagenstad |
| 3,653,446 A | 4/1972 | Kalmon |
| 3,701,327 A | 10/1972 | Krumholz |
| 3,708,019 A | 1/1973 | Ryan |
| 3,718,191 A | 2/1973 | Williams |
| 3,749,035 A | 7/1973 | Cayton |
| 3,753,341 A | 8/1973 | Berg, Jr. |
| 3,766,988 A | 10/1973 | Whitesides |
| 3,774,446 A | 11/1973 | Diehl |
| 3,795,291 A | 3/1974 | Naito |
| 3,939,846 A | 2/1976 | Drozhzhin |
| 3,945,532 A | 3/1976 | Marks |
| 3,975,890 A | 8/1976 | Rodger |
| 4,009,668 A | 3/1977 | Brass |
| 4,018,101 A | 4/1977 | Mihalic |
| 4,044,697 A | 8/1977 | Swanson |
| 4,055,126 A | 10/1977 | Brown |
| 4,058,171 A | 11/1977 | van der Lely |
| 4,063,597 A | 12/1977 | Day |
| 4,096,730 A | 6/1978 | Martin |
| 4,099,576 A | 7/1978 | Jilani |
| 4,122,715 A | 10/1978 | Yokoyama |
| 4,129,082 A | 12/1978 | Betulius |
| 4,141,200 A | 2/1979 | Johnson |
| 4,141,302 A | 2/1979 | Morrison, Jr. |
| 4,141,676 A | 2/1979 | Jannen |
| 4,142,589 A | 3/1979 | Schlagenhauf |
| 4,147,305 A | 4/1979 | Hunt |
| 4,149,475 A | 4/1979 | Bailey |
| 4,157,661 A | 6/1979 | Schindel |
| 4,173,259 A | 11/1979 | Heckenkamp |
| 4,182,099 A | 1/1980 | Davis |
| 4,187,916 A | 2/1980 | Harden |
| 4,191,262 A | 3/1980 | Sylvester |
| 4,194,575 A | 3/1980 | Whalen |
| 4,196,567 A | 4/1980 | Davis |
| 4,196,917 A | 4/1980 | Oakes |
| 4,206,817 A | 6/1980 | Bowerman |
| 4,208,974 A | 6/1980 | Dreyer |
| 4,213,408 A | 7/1980 | West |
| 4,225,191 A | 9/1980 | Knoski |
| 4,233,803 A | 11/1980 | Davis |
| 4,241,674 A | 12/1980 | Mellinger |
| 4,249,613 A | 2/1981 | Scribner |
| 4,280,419 A | 7/1981 | Fischer |
| 4,295,532 A | 10/1981 | Williams |
| 4,301,870 A | 11/1981 | Carre |
| 4,307,674 A | 12/1981 | Jennings |
| 4,311,104 A | 1/1982 | Steilen |
| 4,317,355 A | 3/1982 | Hatsuno |
| 4,359,101 A | 11/1982 | Gagnon |
| 4,375,837 A | 3/1983 | van der Lely |
| 4,377,979 A | 3/1983 | Peterson |
| 4,391,335 A | 7/1983 | Birkenbach |
| 4,398,608 A | 8/1983 | Boetto |
| 4,407,371 A | 10/1983 | Hohl |
| 4,430,952 A | 2/1984 | Murray |
| 4,433,568 A | 2/1984 | Kondo |
| 4,438,710 A | 3/1984 | Paladino |
| 4,445,445 A | 5/1984 | Sterrett |
| 4,461,355 A | 7/1984 | Peterson |
| 4,481,830 A | 11/1984 | Smith |
| 4,499,775 A | 2/1985 | Lasoen |
| 4,506,610 A | 3/1985 | Neal |
| 4,508,178 A | 4/1985 | Cowell |
| 4,528,920 A | 7/1985 | Neumeyer |
| 4,530,405 A | 7/1985 | White |
| 4,537,262 A | 8/1985 | van der Lely |
| 4,538,688 A | 9/1985 | Szucs |
| 4,550,122 A | 10/1985 | David |
| 4,553,607 A | 11/1985 | Behn |
| 4,580,506 A | 4/1986 | Fleischer |
| 4,596,200 A | 6/1986 | Gafford |
| 4,598,654 A | 7/1986 | Robertson |
| 4,603,746 A | 8/1986 | Swales |
| 4,604,906 A | 8/1986 | Scarpa |
| 4,630,773 A | 12/1986 | Ortlip |
| 4,643,043 A | 2/1987 | Furuta |
| 4,646,620 A | 3/1987 | Buchl |
| 4,646,850 A | 3/1987 | Brown |
| 4,650,005 A | 3/1987 | Tebben |
| 4,669,550 A | 6/1987 | Sittre |
| 4,671,193 A | 6/1987 | States |
| 4,674,578 A | 6/1987 | Bexten |
| 4,703,809 A | 11/1987 | Van den Ende |
| 4,726,304 A | 2/1988 | Dreyer |
| 4,738,461 A | 4/1988 | Stephenson |
| 4,744,316 A | 5/1988 | Lienemann |
| 4,762,075 A | 8/1988 | Halford |
| 4,765,190 A | 8/1988 | Strubbe |

(56) References Cited

U.S. PATENT DOCUMENTS

| | | |
|---|---|---|
| 4,768,387 A | 9/1988 | Kemp |
| 4,779,684 A | 10/1988 | Schultz |
| 4,785,890 A | 11/1988 | Martin |
| 4,825,957 A | 5/1989 | White |
| 4,825,959 A | 5/1989 | Wilhelm |
| 4,920,901 A | 5/1990 | Pounds |
| 4,926,767 A | 5/1990 | Thomas |
| 4,930,431 A | 6/1990 | Alexander |
| 4,986,367 A | 1/1991 | Kinzenbaw |
| 4,998,488 A | 3/1991 | Hansson |
| 5,015,997 A | 5/1991 | Strubbe |
| 5,027,525 A | 7/1991 | Haukaas |
| 5,033,397 A | 7/1991 | Colburn, Jr. |
| 5,065,632 A | 11/1991 | Reuter |
| 5,074,227 A | 12/1991 | Schwitters |
| 5,076,180 A | 12/1991 | Schneider |
| 5,092,255 A | 3/1992 | Long |
| 5,113,957 A | 5/1992 | Tamai |
| 5,129,282 A | 7/1992 | Bassett |
| 5,136,934 A | 8/1992 | Darby, Jr. |
| 5,190,112 A | 3/1993 | Johnston |
| 5,224,553 A | 7/1993 | Heintzman |
| 5,234,060 A | 8/1993 | Carter |
| 5,240,080 A | 8/1993 | Bassett |
| 5,255,617 A | 10/1993 | Williams |
| 5,269,237 A | 12/1993 | Baker |
| 5,282,389 A | 2/1994 | Faivre |
| 5,285,854 A | 2/1994 | Thacker |
| 5,333,694 A | 8/1994 | Roggenbuck |
| 5,337,832 A | 8/1994 | Bassett |
| 5,341,754 A | 8/1994 | Winterton |
| 5,346,019 A | 9/1994 | Kinzenbaw |
| 5,346,020 A | 9/1994 | Bassett |
| 5,349,911 A | 9/1994 | Holst |
| 5,351,635 A | 10/1994 | Hulicsko |
| 5,379,847 A | 1/1995 | Snyder |
| 5,394,946 A | 3/1995 | Clifton |
| 5,398,771 A | 3/1995 | Hornung |
| 5,419,402 A | 5/1995 | Heintzman |
| 5,427,192 A | 6/1995 | Stephenson |
| 5,443,023 A | 8/1995 | Carroll |
| 5,443,125 A | 8/1995 | Clark |
| 5,461,995 A | 10/1995 | Winterton |
| 5,462,124 A | 10/1995 | Rawson |
| 5,473,999 A | 12/1995 | Rawson |
| 5,474,135 A | 12/1995 | Schlagel |
| 5,477,682 A | 12/1995 | Tobiasz |
| 5,477,792 A | 12/1995 | Bassett |
| 5,479,868 A | 1/1996 | Bassett |
| 5,479,992 A | 1/1996 | Bassett |
| 5,485,796 A | 1/1996 | Bassett |
| 5,485,886 A | 1/1996 | Bassett |
| 5,497,717 A | 3/1996 | Martin |
| 5,497,837 A | 3/1996 | Kehrney |
| 5,499,683 A | 3/1996 | Bassett |
| 5,499,685 A | 3/1996 | Downing, Jr. |
| 5,517,932 A | 5/1996 | Ott |
| 5,524,525 A | 6/1996 | Nikkel |
| 5,531,171 A | 7/1996 | Whitesel |
| 5,542,362 A | 8/1996 | Bassett |
| 5,544,709 A | 8/1996 | Lowe |
| 5,562,165 A | 10/1996 | Janelle |
| 5,590,611 A | 1/1997 | Smith |
| 5,603,269 A | 2/1997 | Bassett |
| 5,623,997 A | 4/1997 | Rawson |
| 5,640,914 A | 6/1997 | Rawson |
| 5,657,707 A | 8/1997 | Dresher |
| 5,660,126 A | 8/1997 | Freed |
| 5,685,245 A | 11/1997 | Bassett |
| 5,704,430 A | 1/1998 | Smith |
| 5,709,271 A | 1/1998 | Bassett |
| 5,725,057 A | 3/1998 | Taylor |
| 5,727,638 A | 3/1998 | Wodrich |
| 5,852,982 A | 12/1998 | Peter |
| 5,868,207 A | 2/1999 | Langbakk |
| 5,878,678 A | 3/1999 | Stephens |
| RE36,243 E | 7/1999 | Rawson |
| 5,953,895 A | 9/1999 | Hobs |
| 5,970,891 A | 10/1999 | Schlagel |
| 5,970,892 A | 10/1999 | Wendling |
| 5,988,293 A | 11/1999 | Brueggen |
| 6,067,918 A | 5/2000 | Kirby |
| 6,068,061 A | 5/2000 | Smith |
| 6,091,997 A | 7/2000 | Flamme |
| 6,164,385 A | 12/2000 | Buchl |
| 6,223,663 B1 | 5/2001 | Wendling |
| 6,223,828 B1 | 5/2001 | Paulson |
| 6,237,696 B1 | 5/2001 | Mayerle |
| 6,253,692 B1 | 7/2001 | Wendling |
| 6,314,897 B1 | 11/2001 | Hagny |
| 6,325,156 B1 | 12/2001 | Barry |
| 6,330,922 B1 | 12/2001 | King |
| 6,331,142 B1 | 12/2001 | Bischoff |
| 6,343,661 B1 | 2/2002 | Thompson |
| 6,347,594 B1 | 2/2002 | Wendling |
| 6,382,326 B1 | 5/2002 | Goins |
| 6,389,999 B1 | 5/2002 | Duello |
| 6,453,832 B1 | 9/2002 | Schaffert |
| 6,454,019 B1 | 9/2002 | Prairie |
| 6,460,623 B1 | 10/2002 | Knussman |
| 6,516,595 B2 | 2/2003 | Rhody |
| 6,530,334 B2 | 3/2003 | Hagny |
| 6,575,104 B2 | 6/2003 | Brummelhuis |
| 6,644,224 B1 | 11/2003 | Bassett |
| 6,681,868 B2 | 1/2004 | Kovach |
| 6,701,856 B1 | 3/2004 | Zoke |
| 6,701,857 B1 | 3/2004 | Jensen |
| 6,715,433 B1 | 4/2004 | Friestad |
| 6,786,130 B2 | 9/2004 | Steinlage |
| 6,834,598 B2 | 12/2004 | Jüptner |
| 6,840,853 B2 | 1/2005 | Foth |
| 6,886,650 B2 | 5/2005 | Bremmer |
| 6,912,963 B2 | 7/2005 | Bassett |
| 6,968,907 B1 | 11/2005 | Raper |
| 6,986,313 B2 | 1/2006 | Halford |
| 6,997,400 B1 | 2/2006 | Hanna |
| 7,004,090 B2 | 2/2006 | Swanson |
| 7,044,070 B2 | 5/2006 | Kaster |
| 7,063,167 B1 | 6/2006 | Staszak |
| 7,159,523 B2 | 1/2007 | Bourgault |
| 7,222,575 B2 | 5/2007 | Bassett |
| 7,290,491 B2 | 11/2007 | Summach |
| 7,360,494 B2 | 4/2008 | Martin |
| 7,360,495 B1 | 4/2008 | Martin |
| 7,438,006 B2 | 10/2008 | Mariman |
| 7,451,712 B2 | 11/2008 | Bassett |
| 7,523,709 B1 | 4/2009 | Kiest |
| 7,540,333 B2 | 6/2009 | Bettin |
| 7,575,066 B2 | 8/2009 | Bauer |
| 7,584,707 B2 | 9/2009 | Sauder |
| 7,665,539 B2 | 2/2010 | Bassett |
| 7,673,570 B1 | 3/2010 | Bassett |
| 7,743,718 B2 | 6/2010 | Bassett |
| 7,870,827 B2 | 1/2011 | Bassett |
| 7,918,285 B1 | 4/2011 | Graham |
| 7,938,074 B2 | 5/2011 | Liu |
| 7,944,210 B2 | 5/2011 | Fischer |
| 7,946,231 B2 | 5/2011 | Martin |
| 8,146,519 B2 | 4/2012 | Bassett |
| 8,151,717 B2 | 4/2012 | Bassett |
| 8,171,707 B2 | 5/2012 | Kitchel |
| D663,326 S | 7/2012 | Allensworth |
| 8,327,780 B2 | 12/2012 | Bassett |
| 8,359,988 B2 | 1/2013 | Bassett |
| 8,380,356 B1 | 2/2013 | Zielke |
| 8,386,137 B2 | 2/2013 | Sauder |
| 8,393,407 B2 | 3/2013 | Freed |
| 8,408,149 B2 | 4/2013 | Rylander |
| 8,544,397 B2 | 10/2013 | Bassett |
| 8,544,398 B2 | 10/2013 | Bassett |
| 8,550,020 B2 | 10/2013 | Sauder |
| 8,573,319 B1 | 11/2013 | Casper |
| 8,634,992 B2 | 1/2014 | Sauder |
| 8,636,077 B2 | 1/2014 | Bassett |

(56) References Cited

U.S. PATENT DOCUMENTS

| | | |
|---|---|---|
| 8,763,713 B2 | 7/2014 | Bassett |
| 8,770,308 B2 | 7/2014 | Bassett |
| 8,776,702 B2 | 7/2014 | Bassett |
| RE45,091 E | 8/2014 | Bassett |
| 8,863,857 B2 | 10/2014 | Bassett |
| 8,910,581 B2 | 12/2014 | Bassett |
| 8,985,232 B2 | 3/2015 | Bassett |
| 9,055,712 B2 | 6/2015 | Bassett |
| 9,107,337 B2 | 8/2015 | Bassett |
| 9,107,338 B2 | 8/2015 | Bassett |
| 9,113,589 B2 | 8/2015 | Bassett |
| 9,144,187 B2 | 9/2015 | Bassett |
| 9,167,740 B2 | 10/2015 | Bassett |
| 9,192,089 B2 | 11/2015 | Bassett |
| 9,192,091 B2 | 11/2015 | Bassett |
| 9,215,838 B2 | 12/2015 | Bassett |
| 9,215,839 B2 | 12/2015 | Bassett |
| 9,226,440 B2 | 1/2016 | Bassett |
| 9,232,687 B2 | 1/2016 | Bassett |
| 9,241,438 B2 | 1/2016 | Bassett |
| 9,271,437 B2 | 3/2016 | Martin |
| 9,307,690 B2 | 4/2016 | Bassett |
| 2002/0162492 A1 | 11/2002 | Juptner |
| 2004/0005929 A1 | 1/2004 | Piasecki |
| 2006/0102058 A1 | 5/2006 | Swanson |
| 2006/0191695 A1 | 8/2006 | Walker et al. |
| 2006/0237203 A1 | 10/2006 | Miskin |
| 2007/0044694 A1 | 3/2007 | Martin |
| 2007/0272134 A1 | 11/2007 | Baker |
| 2008/0093093 A1 | 4/2008 | Sheppard |
| 2008/0173220 A1 | 7/2008 | Wuertz |
| 2008/0236461 A1 | 10/2008 | Sauder |
| 2008/0256916 A1 | 10/2008 | Vaske |
| 2010/0019471 A1 | 1/2010 | Ruckle |
| 2010/0108336 A1 | 5/2010 | Thomson |
| 2010/0180695 A1 | 7/2010 | Sauder |
| 2010/0198529 A1 | 8/2010 | Sauder |
| 2010/0282480 A1 | 11/2010 | Breker |
| 2011/0247537 A1 | 10/2011 | Freed |
| 2011/0313575 A1 | 12/2011 | Kowalchuk |
| 2012/0167809 A1 | 7/2012 | Bassett |
| 2012/0186216 A1 | 7/2012 | Vaske |
| 2012/0216731 A1 | 8/2012 | Schilling |
| 2012/0232691 A1 | 9/2012 | Green |
| 2012/0255475 A1 | 10/2012 | Mariman |
| 2013/0032363 A1 | 2/2013 | Curry |
| 2013/0112121 A1 | 5/2013 | Achen |
| 2013/0112124 A1 | 5/2013 | Bergen |
| 2013/0213676 A1 | 8/2013 | Bassett |
| 2013/0325267 A1 | 12/2013 | Adams |
| 2013/0333599 A1 | 12/2013 | Bassett |
| 2014/0026748 A1 | 1/2014 | Stoller |
| 2014/0034339 A1 | 2/2014 | Sauder |
| 2014/0034343 A1 | 2/2014 | Sauder |
| 2014/0034344 A1 | 2/2014 | Bassett |
| 2014/0060864 A1 | 3/2014 | Martin |
| 2014/0116735 A1* | 5/2014 | Bassett ............... A01B 61/044 172/2 |
| 2014/0190712 A1 | 7/2014 | Bassett |
| 2014/0224513 A1 | 8/2014 | Van Buskirt |
| 2015/0237791 A1 | 8/2015 | Bassett |
| 2015/0373901 A1 | 12/2015 | Bassett |
| 2016/0066498 A1 | 3/2016 | Bassett |
| 2016/0100520 A1 | 4/2016 | Bassett |
| 2016/0128263 A1 | 5/2016 | Bassett |

FOREIGN PATENT DOCUMENTS

| | | |
|---|---|---|
| DE | 335464 | 9/1921 |
| DE | 1108971 | 6/1961 |
| DE | 24 02 411 | 7/1975 |
| EP | 2 196 337 B1 | 6/2010 |
| EP | 2 497 348 A1 | 9/2012 |
| GB | 1 574 412 | 9/1980 |
| GB | 2 056 238 A | 10/1982 |
| JP | 54-57726 | 5/1979 |
| SU | 392897 | 8/1973 |
| SU | 436778 | 7/1974 |
| SU | 611201 | 6/1978 |
| SU | 625648 | 9/1978 |
| SU | 1410884 A1 | 7/1988 |
| SU | 1466674 | 3/1989 |
| WO | WO 2009/145381 A1 | 12/2009 |
| WO | WO 2011/161140 A1 | 12/2011 |
| WO | WO 2012/149367 A1 | 1/2012 |
| WO | WO 2012/149415 A1 | 1/2012 |
| WO | WO 2012/167244 A1 | 12/2012 |
| WO | WO 2013/025898 A1 | 2/2013 |

OTHER PUBLICATIONS

Buffalo Farm Equipment All Flex Cultivator Operator Manual, Apr. 1990 (7 pages).

Shivvers, Moisture Trac 3000 Brochure, Aug. 21, 1990 (5 pages).

The New Farm, "*New Efficiencies in Nitrogen Application,*" Feb. 1991, p. 6 (1 page).

Hiniker Company, Flow & Acreage Continuous Tracking System Monitor Demonstration Manuel, date estimated as early as Feb. 1991 (7 pages).

Russnogle, John, "*Sky Spy: Gulf War Technology Pinpoints Field and Yields,*" Top Producer, A Farm Journal Publication, Nov. 1991, pp. 12-14 (4 pages).

Borgelt, Steven C., "*Sensor Technologies and Control Strategies for Managing Variability,*" University of Missouri, Apr. 14-16, 1992 (15 pages).

Buffalo Farm Equipment Catalog on Models 4600, 4630, 4640, and 4620, date estimated as early as Feb. 1992 (4 pages).

Hiniker 5000 Cultivator Brochure, date estimated as early as Feb. 1992 (4 pages).

Hiniker Series 5000 Row Cultivator Rigid and Folding Toolbar Operator's Manual, date estimated as early as Feb. 1992 (5 pages).

Orthman Manufacturing, Inc., Rowcrop Cultivator Booklet, date estimated as early as Feb. 1992 (4 pages).

Yetter Catalog, date estimated as early as Feb. 1992 (4 pages).

Exner, Rick, "*Sustainable Agriculture: Practical Farmers of Iowa Reducing Weed Pressure in Ridge-Till,*" Iowa State University University Extension, http://www.extension.iastate.edu/Publications/SA2.pdf, Jul. 1992, Reviewed Jul. 2009, retrieved Nov. 2, 2012 (4 pages).

Finck, Charlene, "*Listen to Your Soil,*" Farm Journal Article, Jan. 1993, pp. 14-15 (2 pages).

Acu-Grain, "*Combine Yield Monitor 99% Accurate? 'You Bet Your Bushels!!'*" date estimated as early as Feb. 1993 (2 pages).

John Deere, New 4435 Hydro Row-Crop and Small-Grain Combine, date estimated as early as Feb. 1993 (8 pages).

Vansichen, R. et al., "*Continuous Wheat Yield Measurement on a Combine,*" date estimated as early as Feb. 1993 (5 pages).

Yetter 2010 Product Catalog, date estimated as early as Jan. 2010 (2 pages).

Yetter Cut and Move Manual, Sep. 2010 (28 pages).

John Deere, Seat Catalog, date estimated as early Sep. 2011 (19 pages).

Martin Industries, LLC Paired 13 Spading Closing Wheels Brochure, date estimated as early as Jun. 6, 2012, pp. 18-25 (8 pages).

Vogt, Willie, "*Revisiting Robotics,*" http://m.farmindustrynews.com/Farm-equipment/revisiting-robotics, Dec. 19, 2013 (3 pages).

John Deere, New Semi-Active Sea Suspension, http://www.deere.com/en_US/parts/agparts/semiactiveseat.html, date estimated as early as Jan. 2014, retrieved Feb. 6, 2014 (2 pages).

International Search Report for PCT Application No. PCT/US2015/059633 dated Mar. 2, 2016 (4 pages).

Written Opinion for PCT Application No. PCT/US2015/059633 dated Mar. 2, 2016 (5 pages).

\* cited by examiner

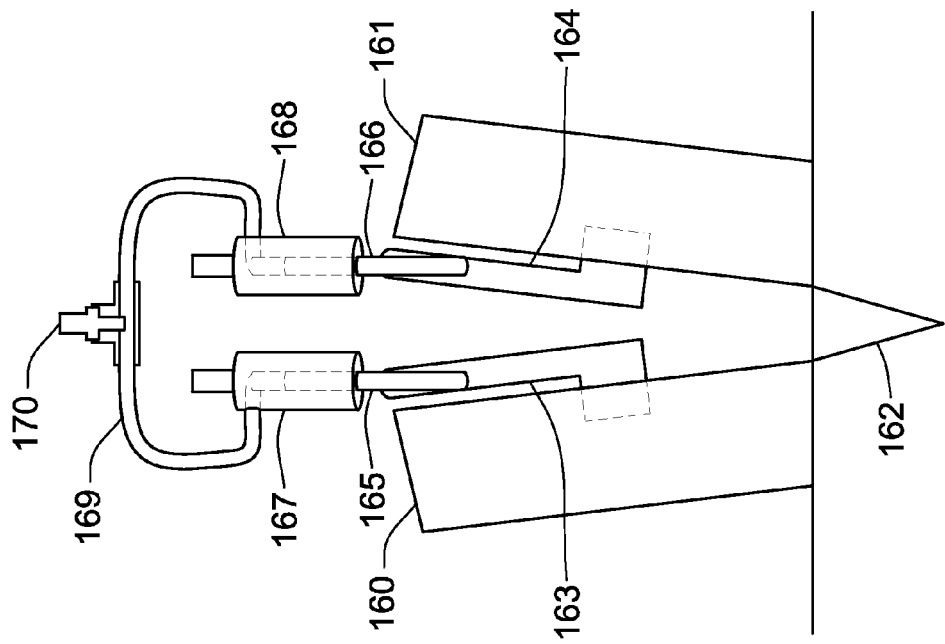
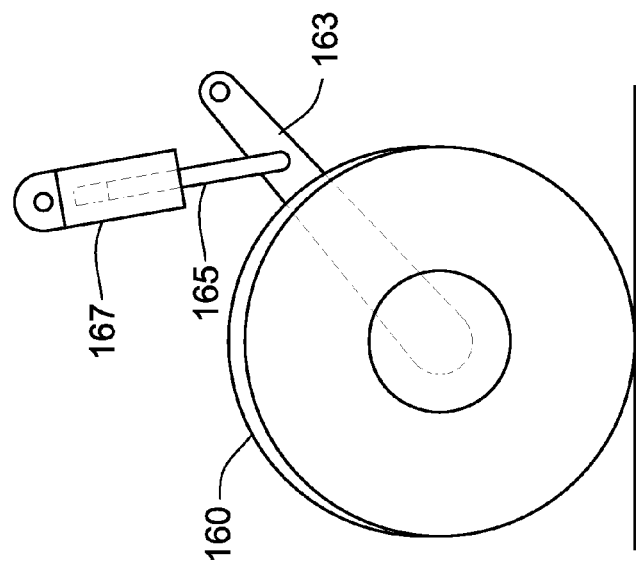
FIG. 15B
FIG. 15A

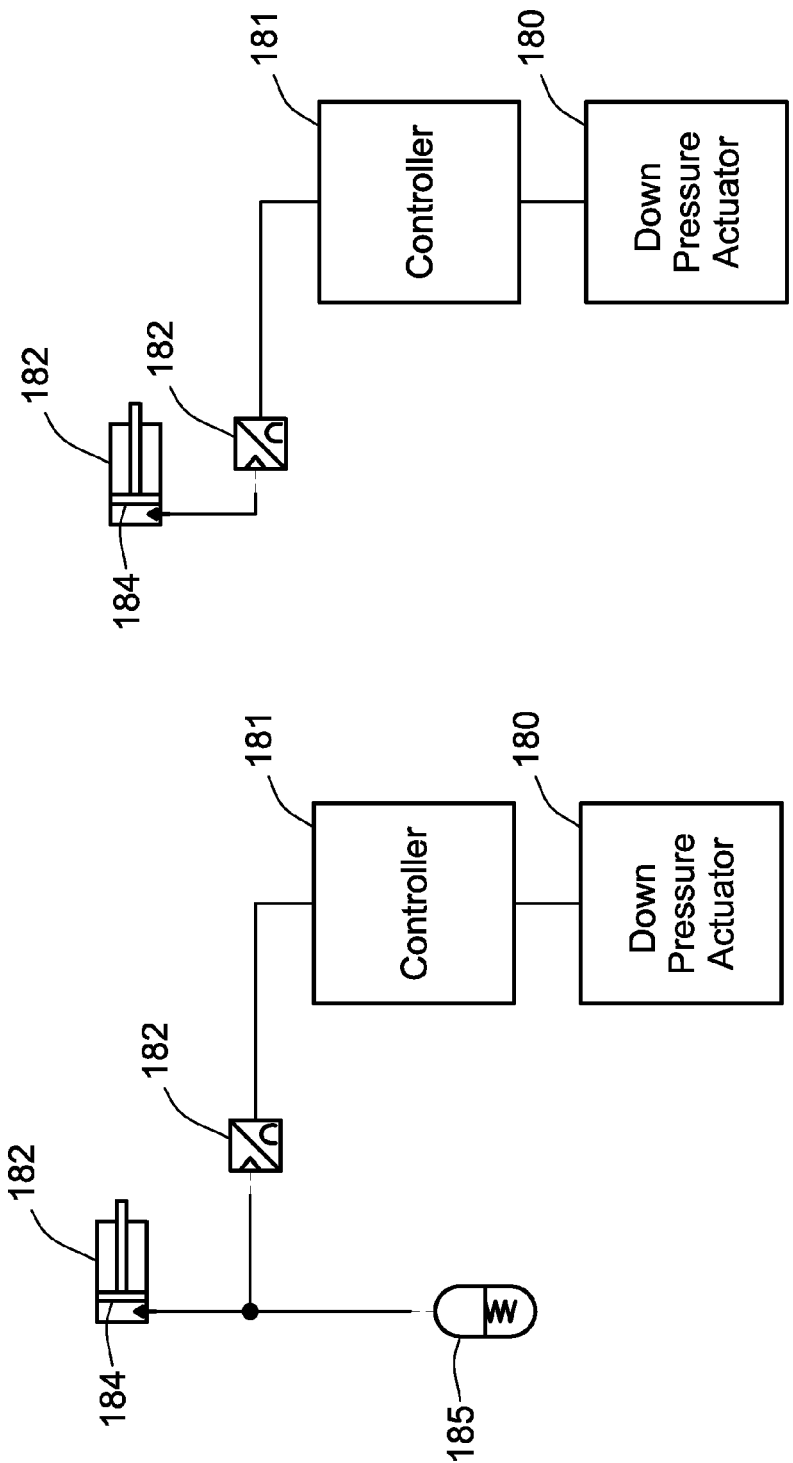

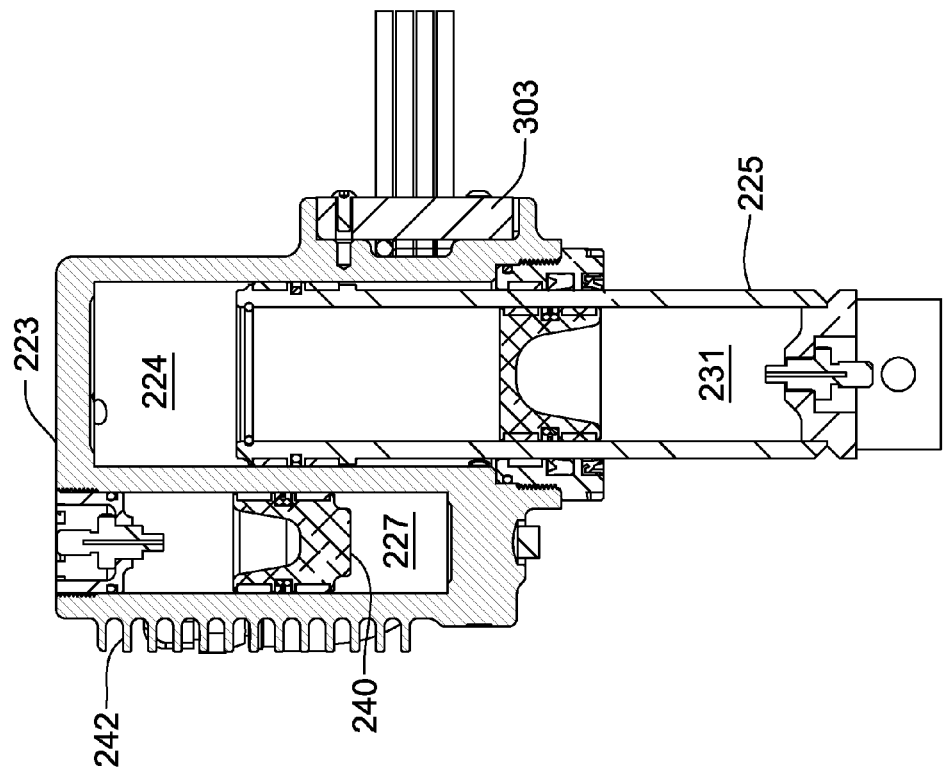
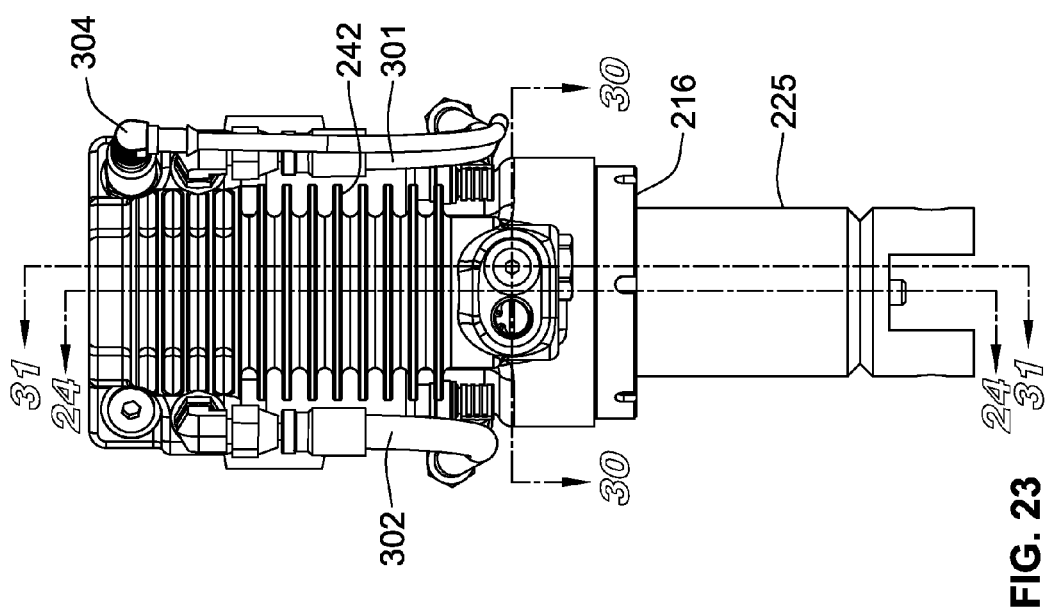
FIG. 24
FIG. 23

US 9,723,778 B2

AGRICULTURAL SYSTEM

CROSS-REFERENCE TO RELATED APPLICATIONS

This application is a continuation-in-part of and claims priority to U.S. patent application Ser. No. 14/593,492, filed Jan. 9, 2015, U.S. Provisional Application No. 62/085,334, filed Nov. 28, 2014; and U.S. Provisional Application No. 62/076,767, filed Nov. 7, 2014, each of which is hereby incorporated by reference herein in its entirety.

FIELD OF THE INVENTION

This invention relates generally to agricultural planters and, more particularly, to gauge wheel load sensors and down pressure control systems for agricultural planters.

BRIEF SUMMARY

In accordance with one embodiment, a hydraulic control system for controlling the down force on an agricultural implement comprising a hydraulic cylinder containing a movable ram, a source of pressurized fluid coupled to the hydraulic cylinder on a first side of the ram by a first controllable valve, a fluid sump coupled to the hydraulic cylinder on the first side of the ram by a second controllable valve, and an electrical controller coupled to the valves for opening and closing the valves. The valves are preferably self-latching valves, such as magnetic latching valves, that remain in an open or closed position until moved to the other position in response to a signal from the controller. Alternatively, the valves may be non-latching valves that are spring-biased toward their closed positions. A pair of energy storage devices, such as accumulators, may be coupled to the cylinder on opposite sides of the ram. A pressure transducer is preferably coupled to the cylinder on one side of the ram. A pair of check valves may couple the cylinder to the energy storage device and to the controllable valves.

BRIEF DESCRIPTION OF THE DRAWINGS

FIG. 15A is a side elevation of a modified sensing system for detecting the pressure exerted on a pair of gauge wheels.

FIG. 15B is an end elevation of the system shown in FIG. 15A.

FIG. 18 is a schematic diagram of a second modified hydraulic and electrical control system for controlling a down pressure actuator.

FIG. 19 is a schematic diagram of a third modified hydraulic and electrical control system for controlling a down pressure actuator.

FIG. 23 is an enlarged side elevation of the control assembly shown in FIGS. 21 and 22, from the left side of the assembly as shown in FIG. 21.

FIG. 24 is a section taken along line 19-19 in FIG. 23.

DETAILED DESCRIPTION

An agricultural planter typically includes a number of individual row units, each of which includes its own row cleaner device, row opener device and row closing device. The down pressure is typically controlled separately for each row unit or each of several groups of row units, and is preferably controlled separately for one or more of the individual devices in each row unit, as described in more detail in pending U.S. application Ser. No. 14/146,822 filed Jan. 3, 2014, which is incorporated by reference herein in its entirety.

Figure 1:
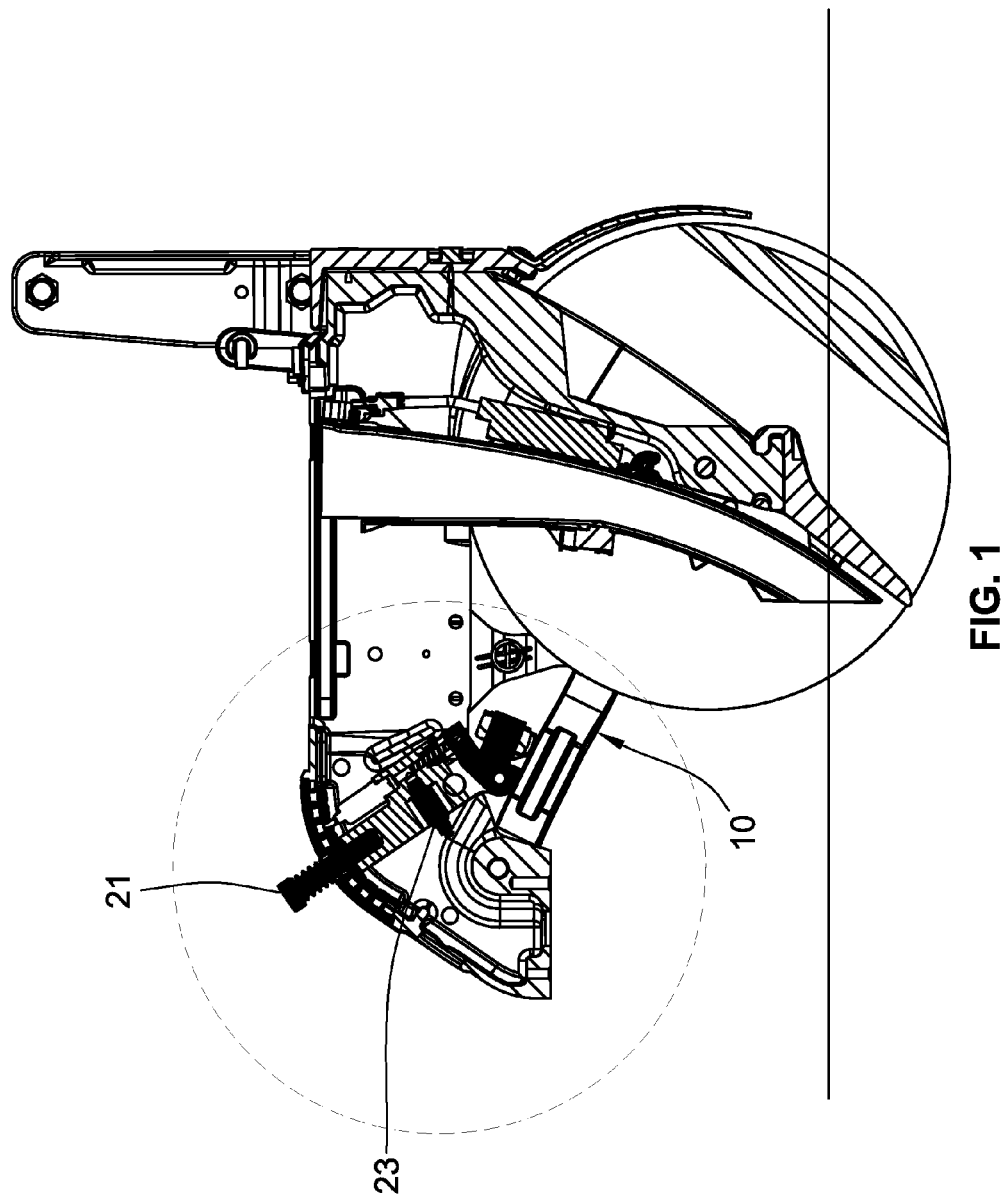
FIG. 1 is a vertical longitudinal section through a portion of an agricultural planter that includes a gauge wheel and an opener device.
Figure 2:
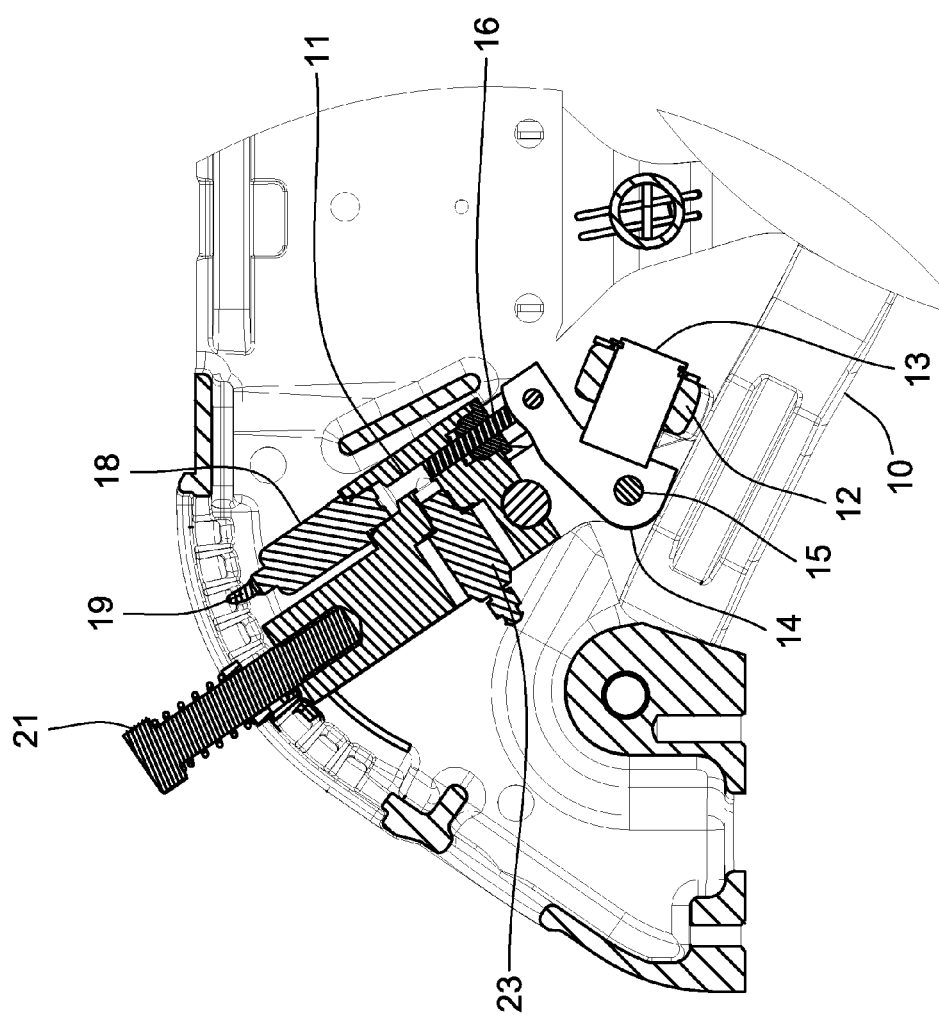
FIG. 2 is an enlargement of the left side of FIG. 1.
Figure 3:
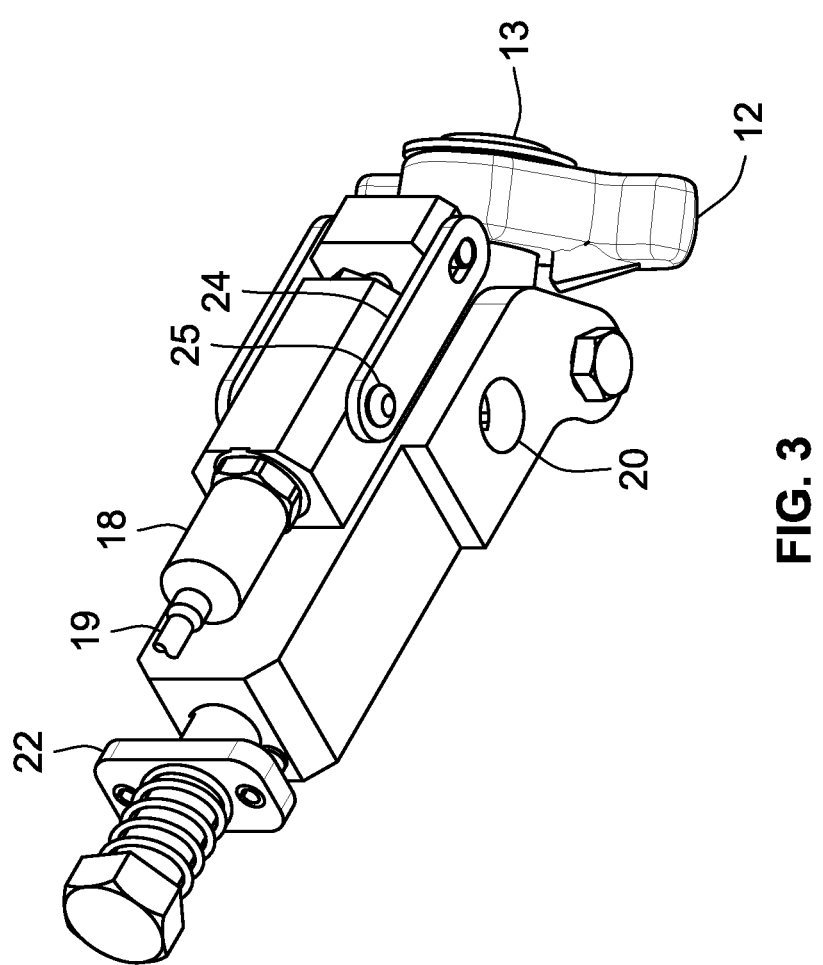
FIG. 3 is a bottom perspective of the control portion of the equipment shown in FIG. 1.
Figure 4:
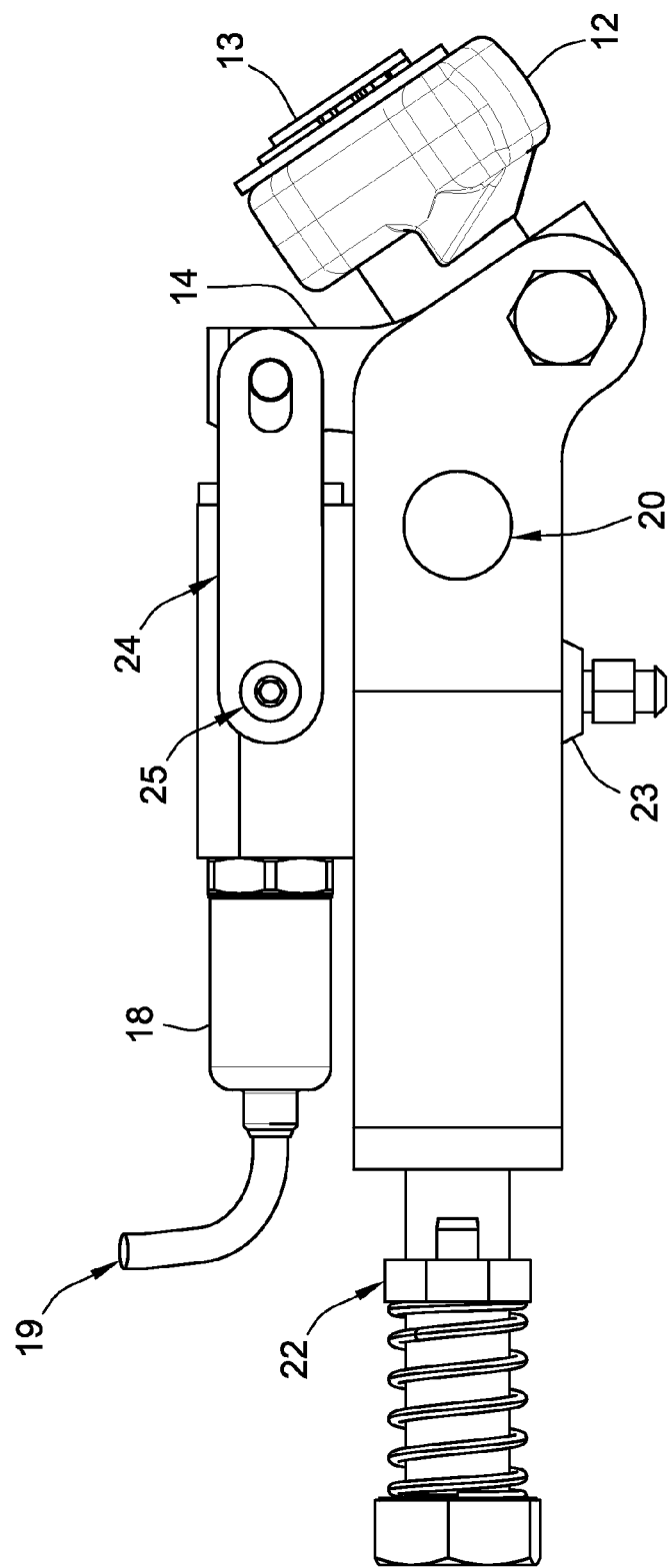
FIG. 4 is an enlarged side elevation of the equipment shown in FIG. 3.
Figure 5:
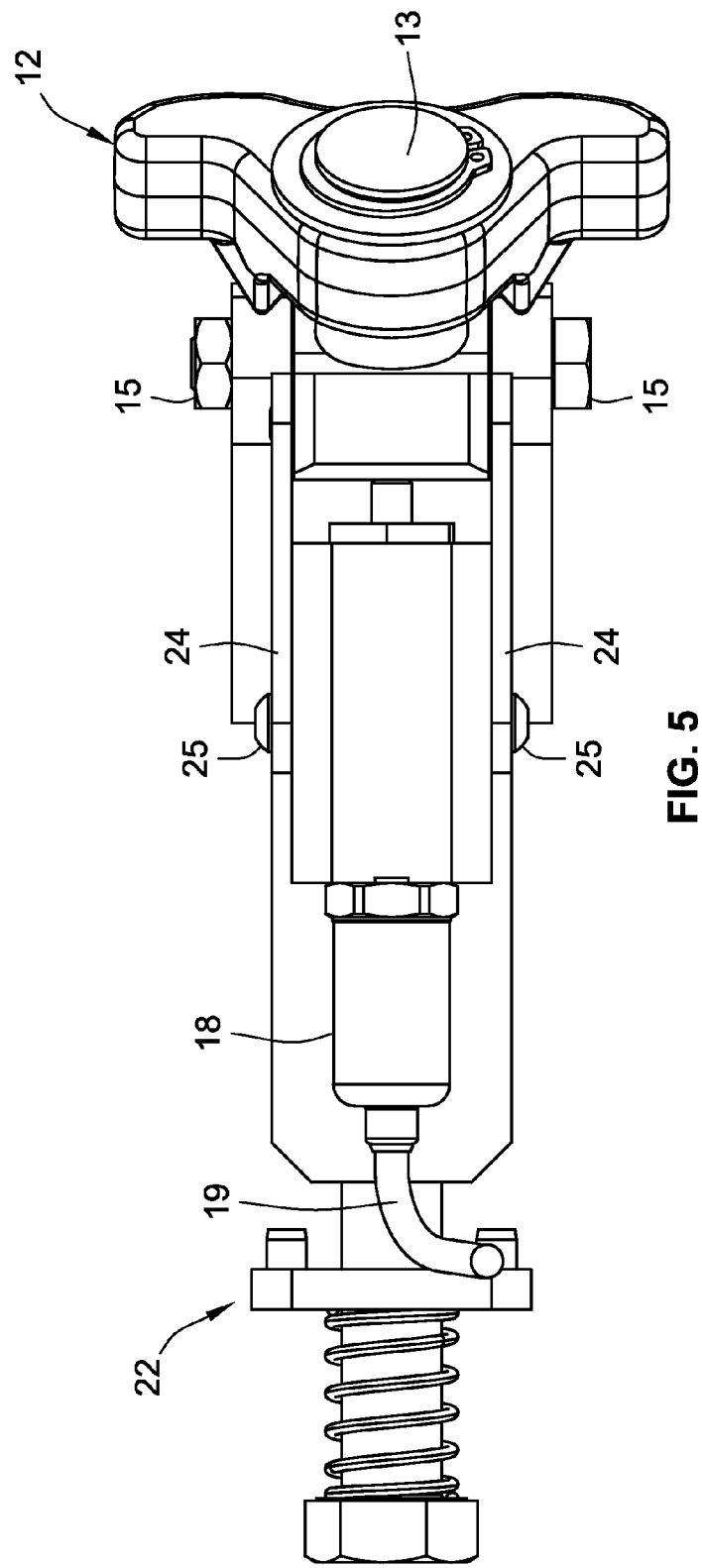
FIG. 5 is an enlarged top plan view of the equipment shown in FIG. 3.
Figure 6:
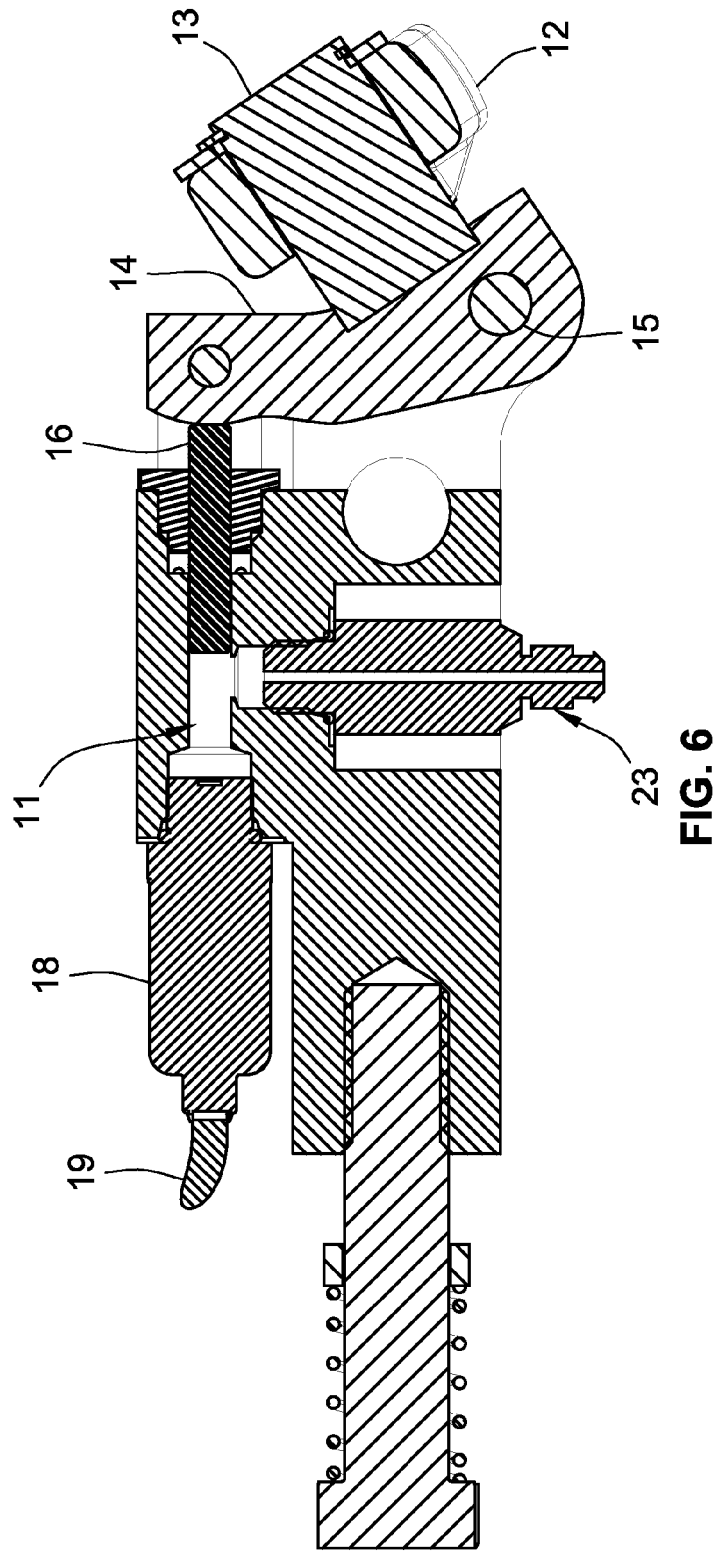
FIG. 6 is an enlarged vertical longitudinal section through the equipment shown in FIG. 3.
Figure 7:
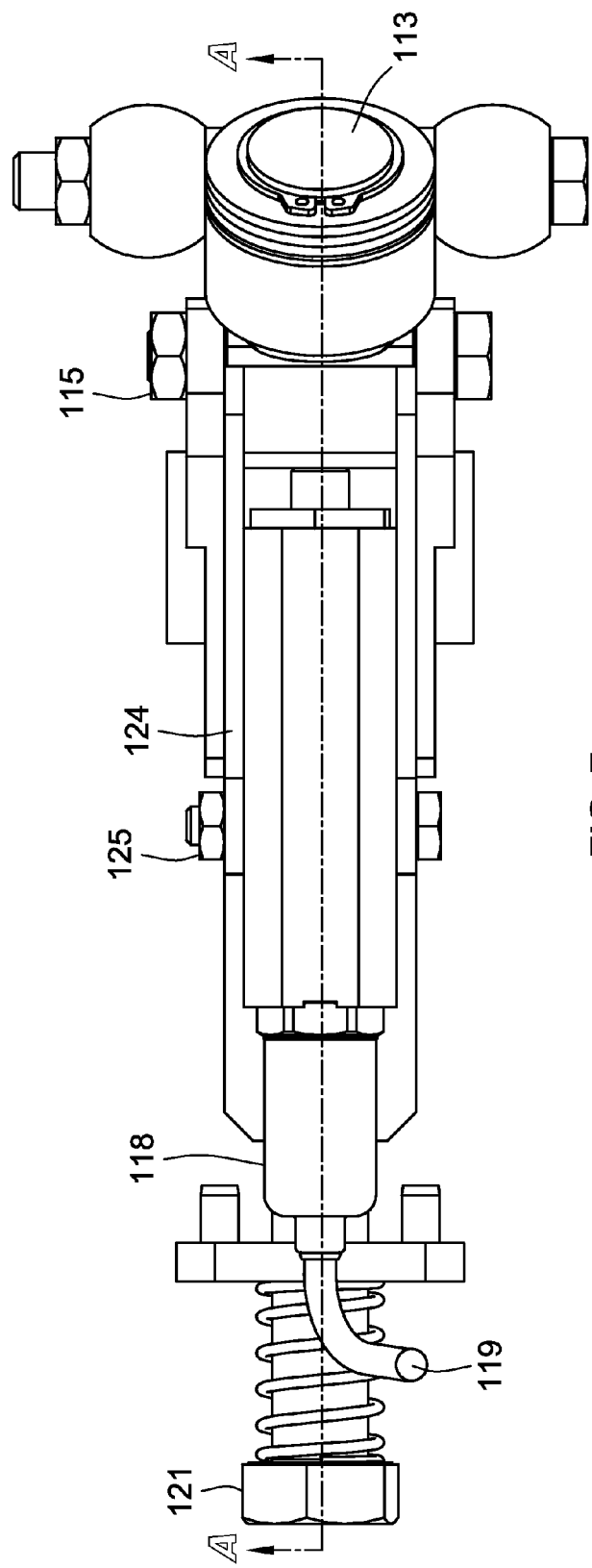
FIG. 7 is a plan view of a gauge wheel transducer system for an agricultural planter that includes a gauge wheel and an opener device.
Figure 8:
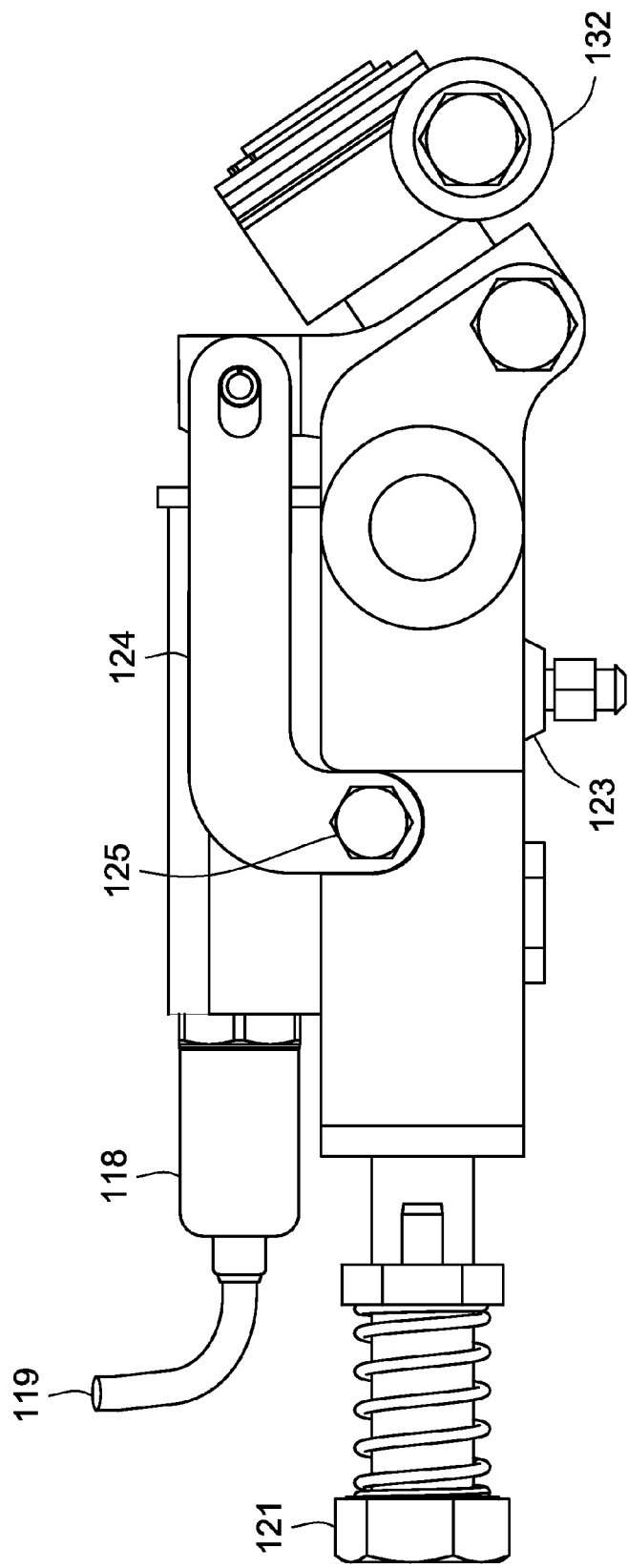
FIG. 8 is a side elevation of the transducer system shown in FIG. 7.
Figure 9:
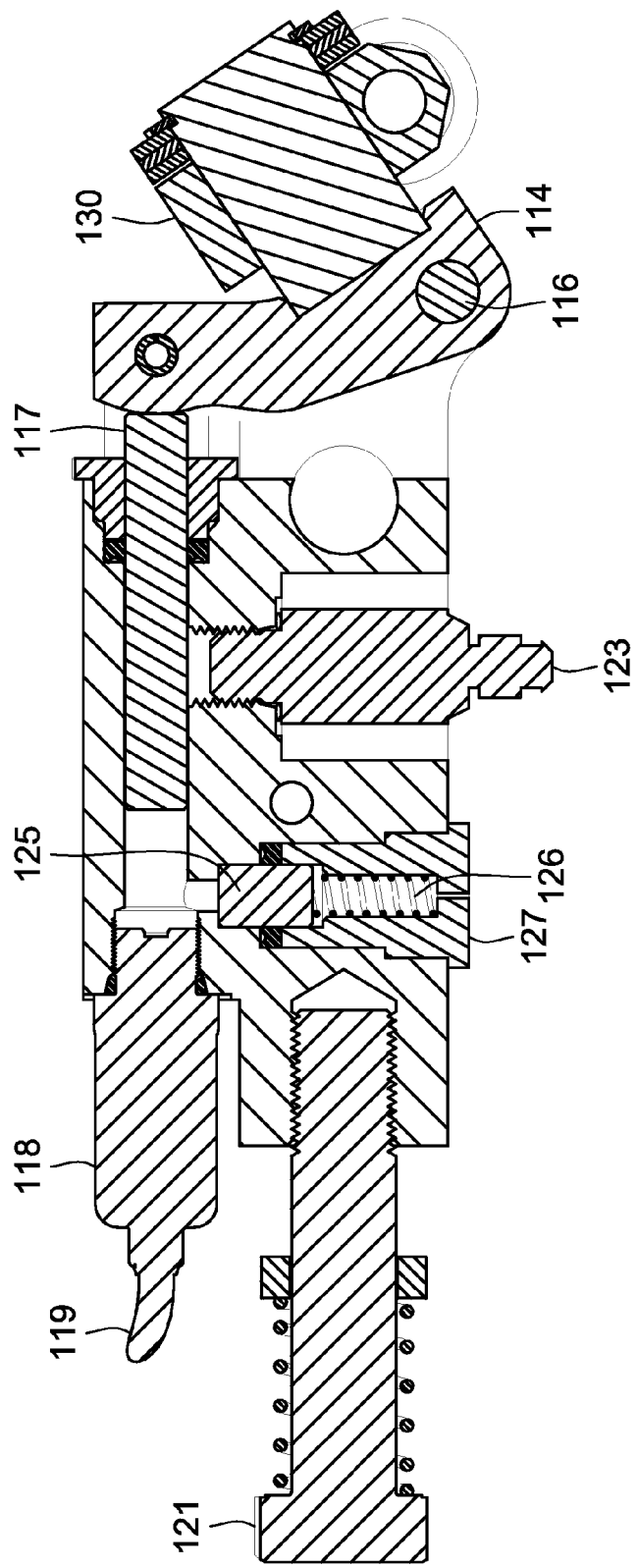
FIG. 9 is a sectional view taken along line A-A in FIG. 7.
Figure 10:
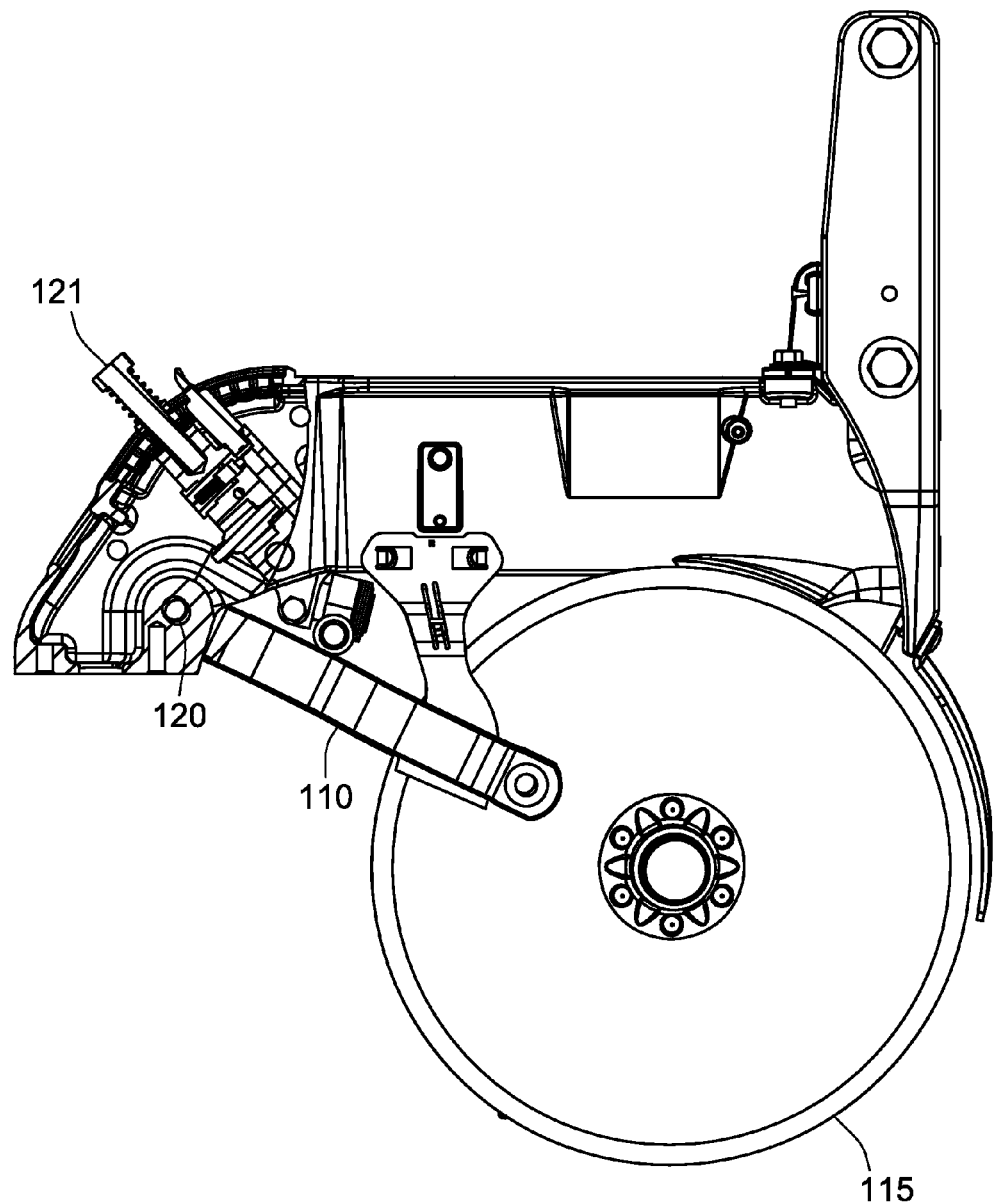
FIG. 10 is a side elevation, partially in section, of the transducer system of FIGS. 7-9 mounted on a gauge wheel and its supporting structure.
Figure 11:
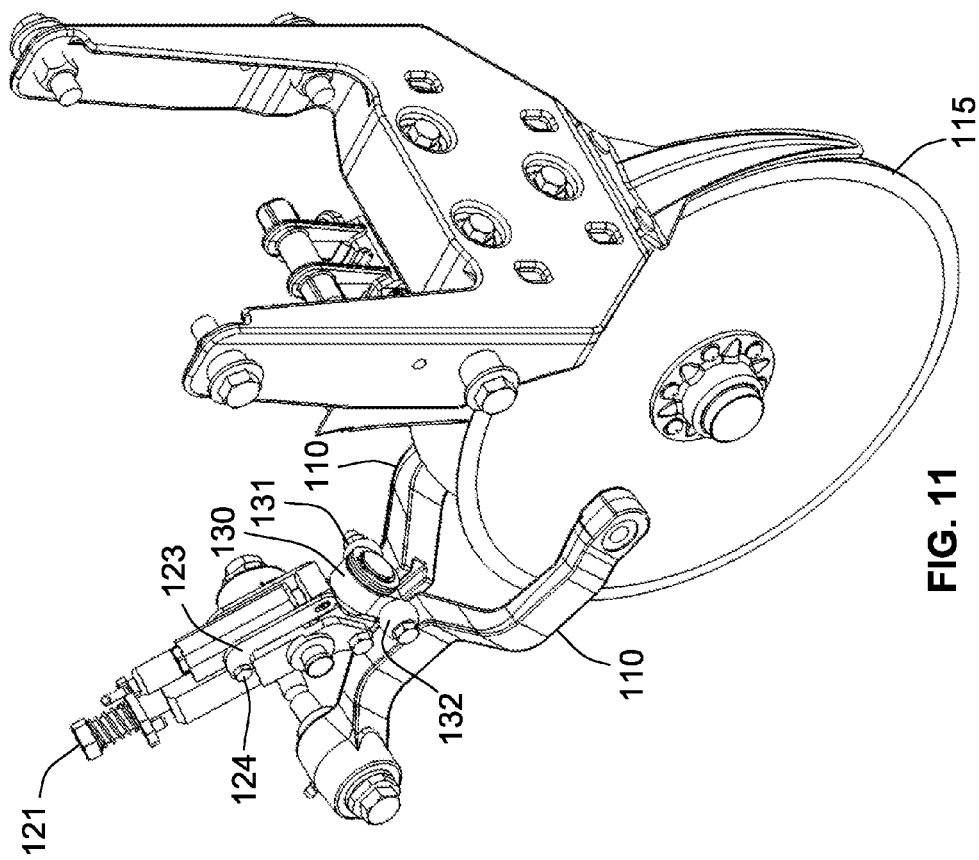
FIG. 11 is a perspective view of portions of the devices shown in FIG. 10.
Figure 12:
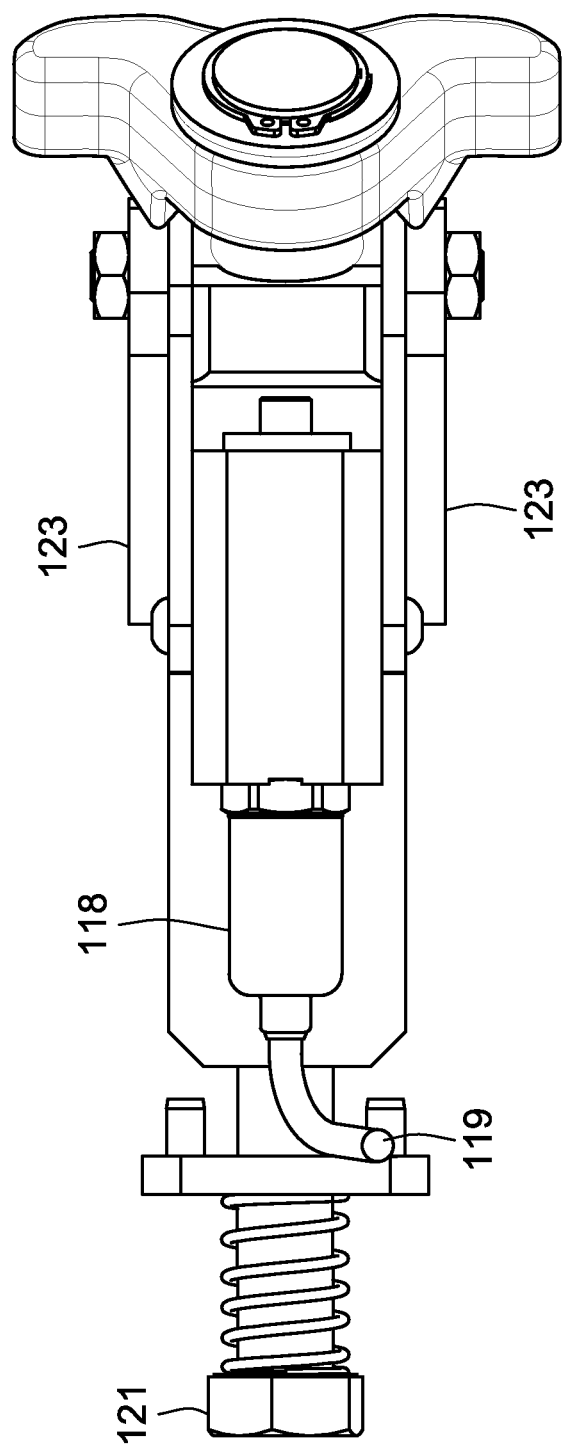
FIG. 12 is a plan view similar to FIG. 7 but with portions removed to show the equalizer arm.

FIGS. 1-6 illustrate an improved gauge wheel load sensor that takes the upward force from a pivoting planter gauge wheel support, such as the pivoting support arms 10 in the row unit equipment shown in FIGS. 1 and 2, and translates that force into a fluid pressure in a fluid chamber 11. The gauge wheel support arms push against an equalizer support 12, which is connected via a pivot 13 with a rocker/cam 14. The force on the gauge wheel due to the weight of the row unit and applied down force causes the rocker/cam 14 to pivot around a pivot bolt 15 and push against a hydraulic ram 16. This force on the ram 16 causes the fluid in the chamber 11 to pressurize. The pressure is proportional to the amount of gauge wheel load. A pressure transducer 18 reads the amount of pressure and sends a signal to a row unit down pressure controller via signal line 19. This signal allows the planter row unit down pressure to be controlled to a desired level.

Depth adjustment is accomplished in the conventional sense by pivoting the assembly around a pivot 20, and locking a handle 21 into the desired position with a mechanism 22. With this design it is imperative that that there is no air trapped in the fluid chamber 11. For this reason the mechanism includes a bleed valve 23. The process for removal of air is to extend the ram to the maximum extent with calibration/travel limiter plates 24 (FIG. 4) removed. The system is then filled completely with fluid with the bleed valve 23 closed. Then the bleed valve 23 is opened, and the rocker arm 14 is pushed against the ram 16 to move the ram to the exact place where the calibration/travel limit plates 24 allow a calibration plate retaining screw 25 to fit into a hole. This ensures that each assembly is set the same so all the row units of the planter are at the same depth. At this point the bleed valve 23 is closed. With all air removed, the mechanical/fluid system will act as a rigid member against forces in compression. The travel limiter plate 24 keeps a cam pivot weldment 27 from falling down when the planter is lifted off the ground.

Standard industry practice is to use a strain gauge to directly measure the planter gauge wheel load. The design shown in FIGS. 1-6 is an improvement over the state of the art because it allows the sensor to measure only the down force on the gauge wheels. In typical designs using strain gauge type sensors, the mechanical linkage that allows the gauge wheels to oscillate causes the measured wheel force to have substantial noise due to changes in the force being applied. For this reason it can be difficult to determine which parts of the signal correspond to actual changes in down force on the gauge wheels, versus signal changes that are due to movement of components of the gauge wheel support mechanism. The reason for this is that strain gauge sensors will only measure the force that is being applied in a single plane. Because of the linkage and pivot assembly that is used on typical planters, the force being applied to the strain gauge type designs can change based on the depth setting or whether the planter gauge wheels are oscillating over terrain. In this way they will tend to falsely register changes in gauge wheel down force and make it difficult to have a closed loop down pressure response remain consistent.

Additionally, the fluid seal of the pressure sensor creates friction in the system which has the effect of damping out high frequency noise. Agricultural fields have very small scale variations in the surface which causes noise to be produced in the typical down force sensor apparatus. By using fluid pressure this invention decouples the sensor from the mechanical linkage and allows the true gauge wheel force to be more accurately measured. Lowering the amount of systematic noise in the gauge wheel load output sensor makes it easier to produce an automatic control system that accurately responds to true changes in the hardness of the soil as opposed to perceived changes in soil hardness due to noise induced on the sensor.

FIGS. 7-12 illustrate a modified gauge wheel load sensor that includes an integrated accumulator 125. The purpose of the accumulator 125 is to damp pressure spikes in the sensor when the planter is operating at low gauge wheel loads. When the forces that the gauge wheel support arms 110 are exerting on the hydraulic ram 117 are near zero, it is more common for the surface of the soil or plant residue to create pressure spikes that are large in relation to the desired system sensor pressure. As the target gauge wheel down force increases, and consequently the pressure in the fluid chamber 111 and the transducer output voltage from sensor 118, the small spikes of pressure due to variation in the soil surface or plant residue decreases proportionally.

In the present system, rather than have a perfectly rigid fluid coupling between the ram 117 and the pressure transducer 118, as load increases on the ram 117, the fluid first pushes against an accumulator 122 that is threaded into a side cavity 123 in the same housing that forms the main cavity for the ram 117, compressing an accumulator spring 126 until the piston 125 rests fully against a shoulder on the interior wall of the accumulator housing 127, thus limiting the retracting movement of the accumulator piston 125. At this point, the system becomes perfectly rigid. The amount of motion permitted for the accumulator piston 125 must be very small so that it does not allow the depth of the gauge wheel setting to fluctuate substantially. The piston accumulator (or other energy storage device) allows the amount of high frequency noise in the system to be reduced at low gauge-wheel loads. Ideally an automatic down pressure control system for an agricultural planter should maintain a down pressure that is as low as possible to avoid over compaction of soil around the area of the seed, which can inhibit plant growth. However, the performance of most systems degrades as the gauge wheel load becomes close to zero, because the amount of latent noise produced from variation in the field surface is large in relation to the desired gauge wheel load.

Planter row units typically have a gauge wheel equalizer arm 130 that is a single unitary piece. It has been observed that the friction between the equalizer arm 130 and the gauge wheel support arms 110, as the gauge wheel 115 oscillates up and down, can generate a substantial amount of noise in the sensor. At different adjustment positions, the edges of the equalizer arm 130 contact the support arms 10 at different orientations and can bite into the surface and prevent forces from being smoothly transferred as they increase and decrease. When the equalizer arm 130 is a single unitary piece, there is necessarily a high amount of friction that manifests itself as signal noise in the sensor. This signal noise makes it difficult to control the down pressure system, especially at low levels of gauge wheel load.

Figure 13:
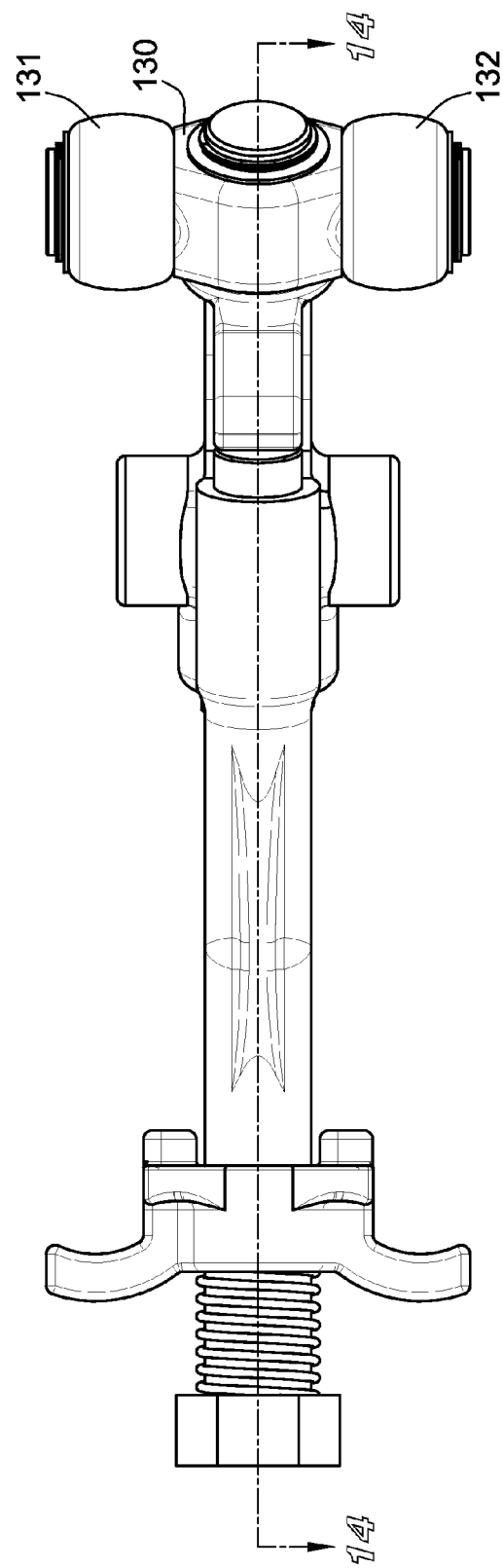
FIG. 13 is a plan view of a modified transducer system.

To alleviate this situation, the equalizer arm 130 illustrated in FIG. 13 has a pair of contact rollers 131 and 132 are mounted on opposite ends of the equalizer arm. These rollers 131 and 132 become the interface between the equalizer arm and the support arms 110, allowing forces to be smoothly transferred between the support arms 110 and the equalizer arm 130. The roller system allows the gauge wheel support arms 110 to oscillate relative to each other without producing any sliding friction between the support arms 110 and the equalizer arm 130. This significantly reduces the friction that manifests itself as signal noise in the sensor output, which makes it difficult to control the down pressure control system, especially at low levels of gauge wheel load.

Figure 14:
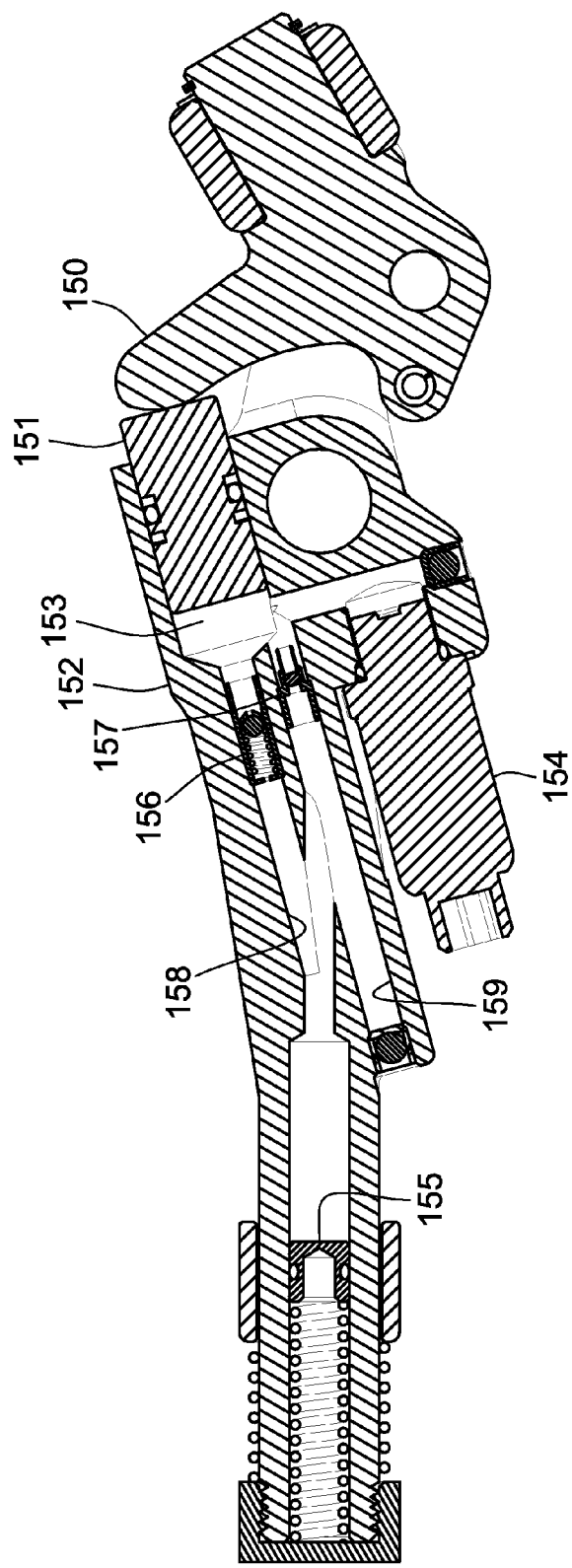
FIG. 14 is a longitudinal section taken along line 14-14 in FIG. 13.

FIG. 14 is a longitudinal section through the device of FIG. 13, with the addition of a rocker arm 150 that engages a ram 151 that controls the fluid pressure within a cylinder 152. A fluid chamber 153 adjacent the inner end of the ram 151 opens into a lateral cavity that contains a pressure transducer 154 that produces an electrical output signal representing the magnitude of the fluid pressure in the fluid chamber 153. The opposite end of the cylinder 152 includes an accumulator 155 similar to the accumulator 125 included in the device of FIG. 9 described above. Between the fluid chamber 153 and the accumulator 155, a pair of valves 156 and 157 are provided in parallel passages 158 and 159 extending between the chamber 153 and the accumulator 155. The valve 156 is a relief valve that allows the pressurized fluid to flow from the chamber 153 to the accumulator 155 when the ram 151 advances farther into the chamber 153. The valve 157 is a check valve that allows pressurized fluid to flow from the accumulator 155 to the chamber 153 when the ram 151 moves outwardly to enlarge the chamber 153. The valves 156 and 157 provide overload protection (e.g., when one of the gauge wheels hits a rock) and to ensure that the gauge wheels retain their elevation setting.

FIGS. 15A and 15B illustrate a modified sensor arrangement for a pair of gauge wheels 160 and 161 rolling on opposite sides of a furrow 162. The two gauge wheels are independently mounted on support arms 163 and 164 connected to respective rams 165 and 166 that control the fluid pressure in a pair of cylinders 167 and 168. A hydraulic hose 169 connects the fluid chambers of the respective cylinders 167 and 168 to each other and to a common pressure transducer 170, which produces an electrical output signal corresponding to the fluid pressure in the hose 169. The output signal is supplied to an electrical controller that uses that signal to control the down forces applied to the two gauge wheels 160 and 161. It will be noted that the two gauge wheels can move up and down independently of each other, so the fluid pressure sensed by the transducer 170 will be changed by vertical movement of either or both of the gauge wheels 160 and 161.

Figure 17:
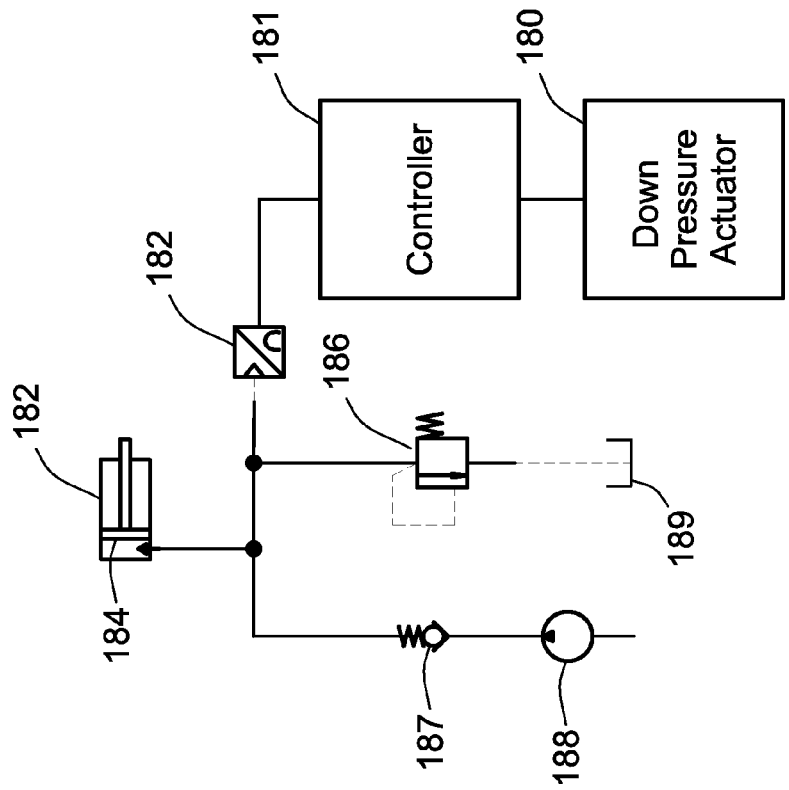
FIG. 17 is a schematic diagram of a first modified hydraulic and electrical control system for controlling a down pressure actuator.
Figure 16:
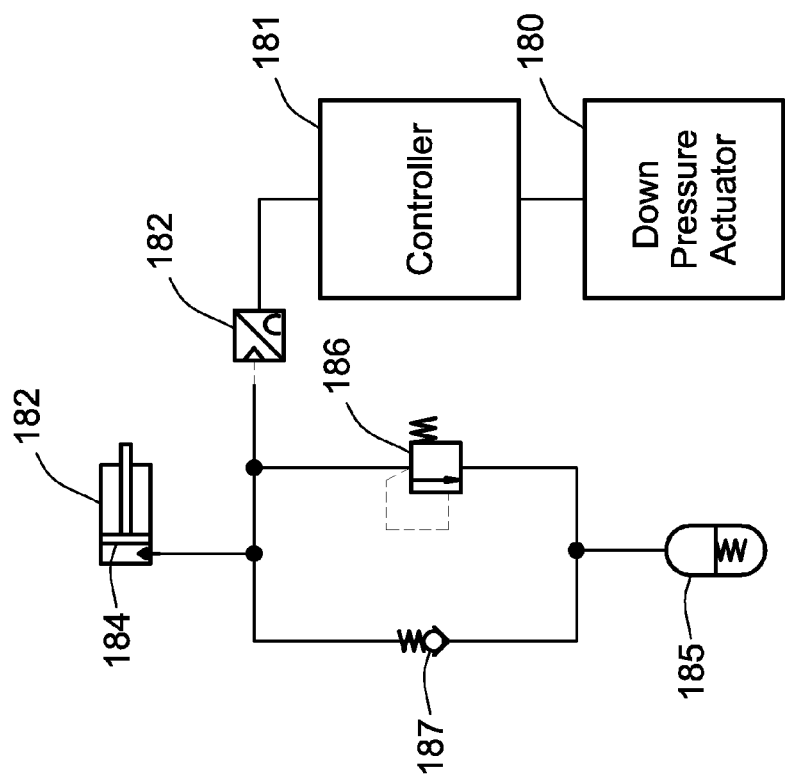
FIG. 16 is a schematic diagram of a hydraulic and electrical control system for controlling a down pressure actuator.

FIGS. 16-19 illustrate electrical/hydraulic control systems that can be used to control a down-pressure actuator 180 in response to the electrical signal provided to a controller 181 by a pressure transducer 182. In each system the transducer 182 produces an output signal that changes in proportion to changes in the fluid pressure in a cylinder 183 as the position of a ram 184 changes inside the cylinder 183. In FIG. 16, the pressurized fluid chamber in the cylinder 183 is coupled to an accumulator 185 by a relief valve 186 to allow pressurized fluid to flow to the accumulator, and by a check valve 187 to allow return flow of pressurized fluid from the accumulator to the cylinder 183. In FIG. 17, the accumulator 185 is replaced with a pressurized fluid source 188 connected to the check valve 187, and a sump 189 connected to the relief valve 186. In FIG. 18, the accumulator 185 is connected directly to the pressurized fluid chamber in the cylinder 183, without any intervening valves. In the system of FIG. 19, the pressure sensor 182 is connected directly to the pressurized fluid chamber in the cylinder 183.

Figure 20:
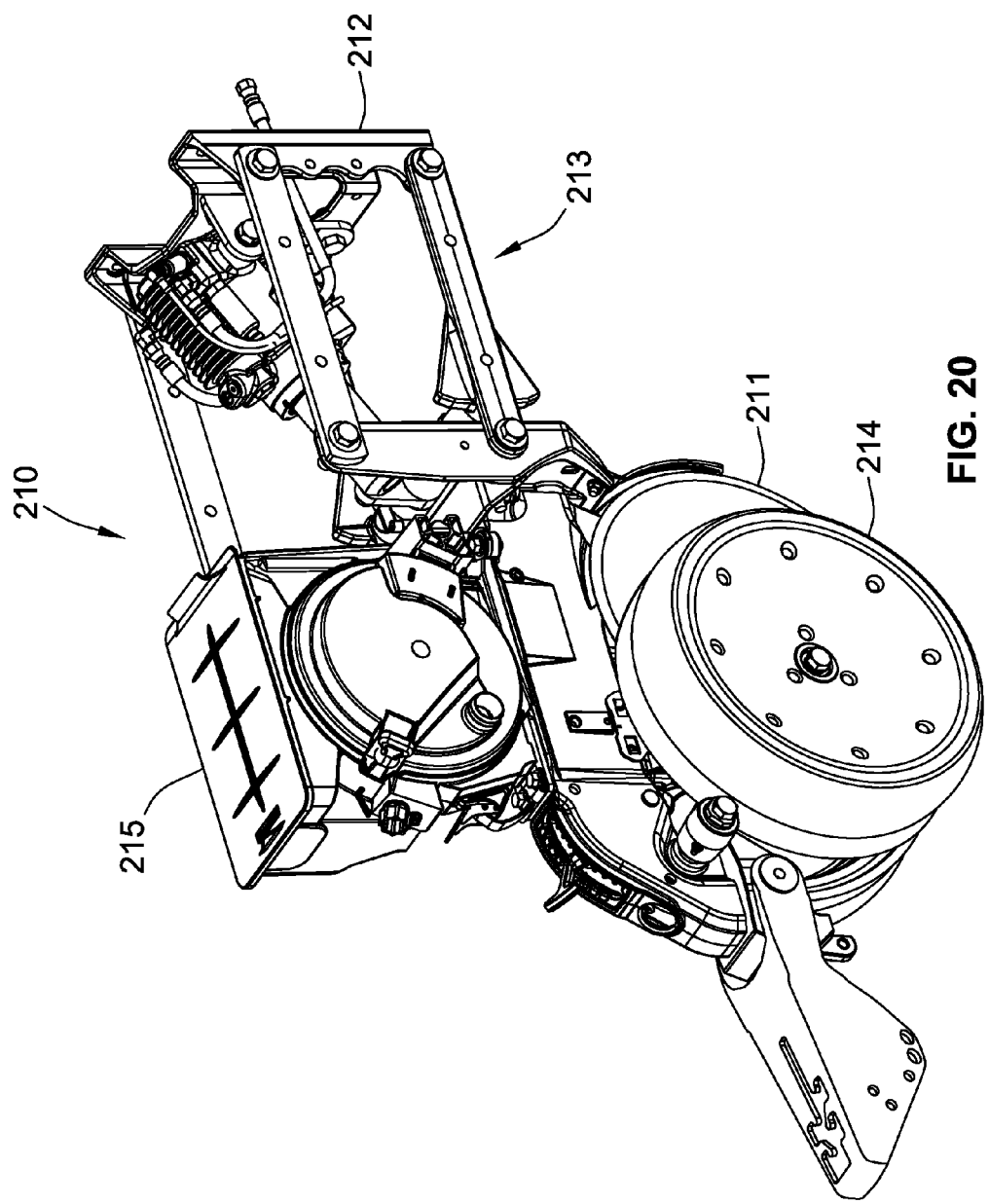
FIG. 20 is a perspective view of a planting row unit adapted to be attached to a towing frame.
Figure 21:
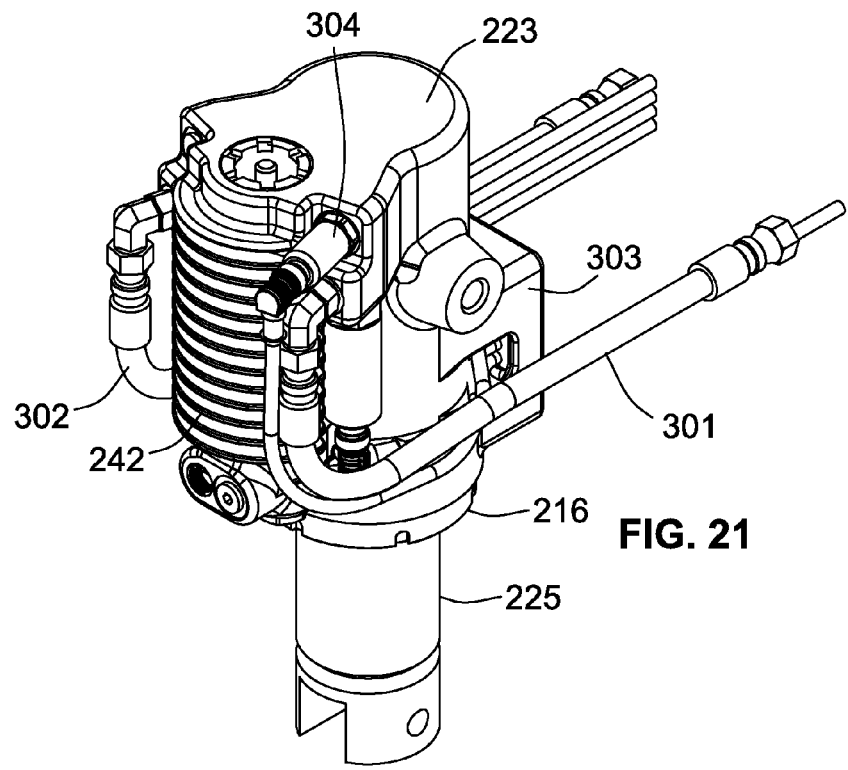
FIG. 21 is an enlarged perspective view of the down-pressure control assembly in the row unit of FIG. 20.
Figure 22:
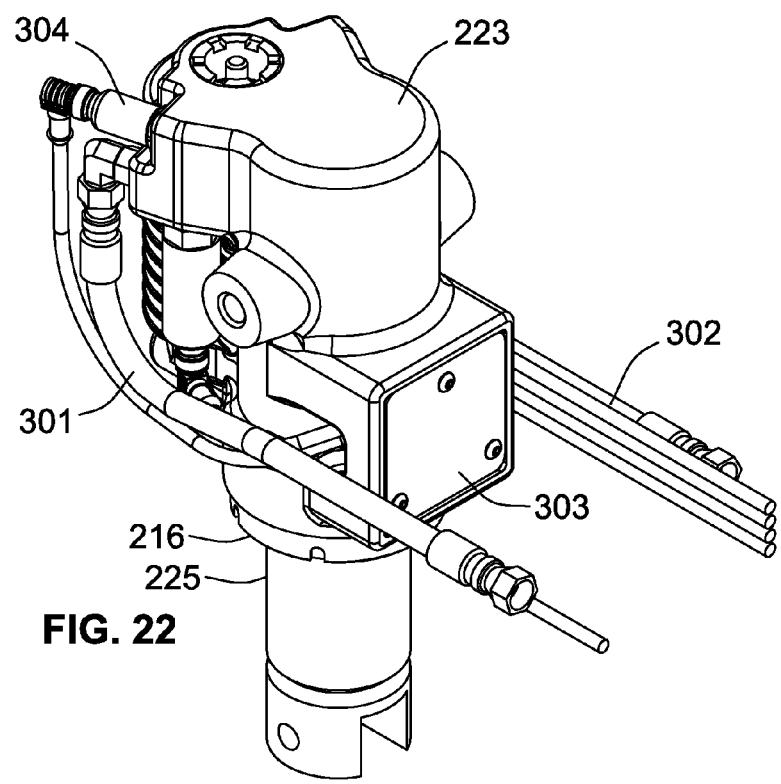
FIG. 22 is the same perspective view shown in FIG. 16, rotated 90 degrees in a clockwise direction.
Figure 26:
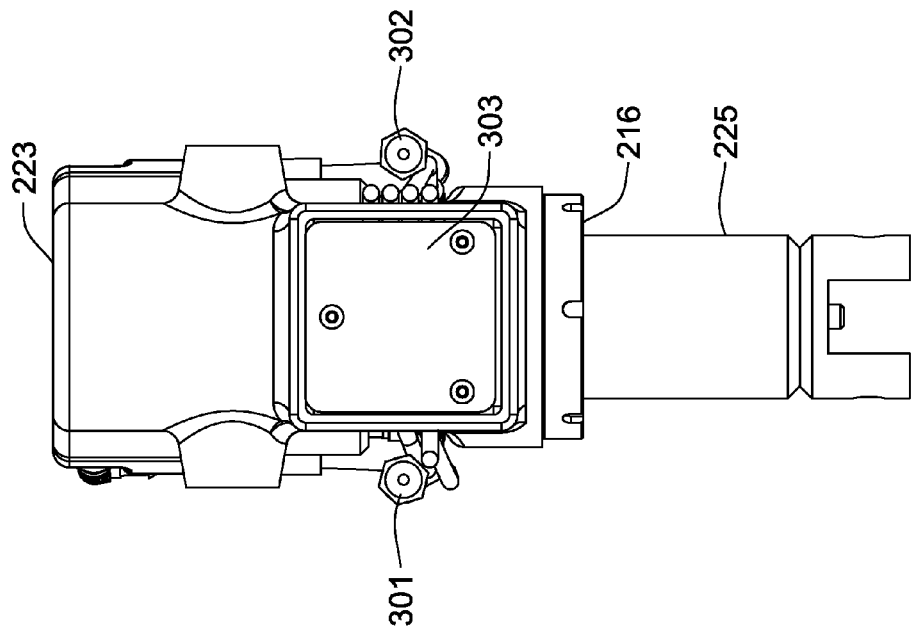
FIG. 26 is a side elevation of the right side of the control assembly shown in FIG. 25.
Figure 25:
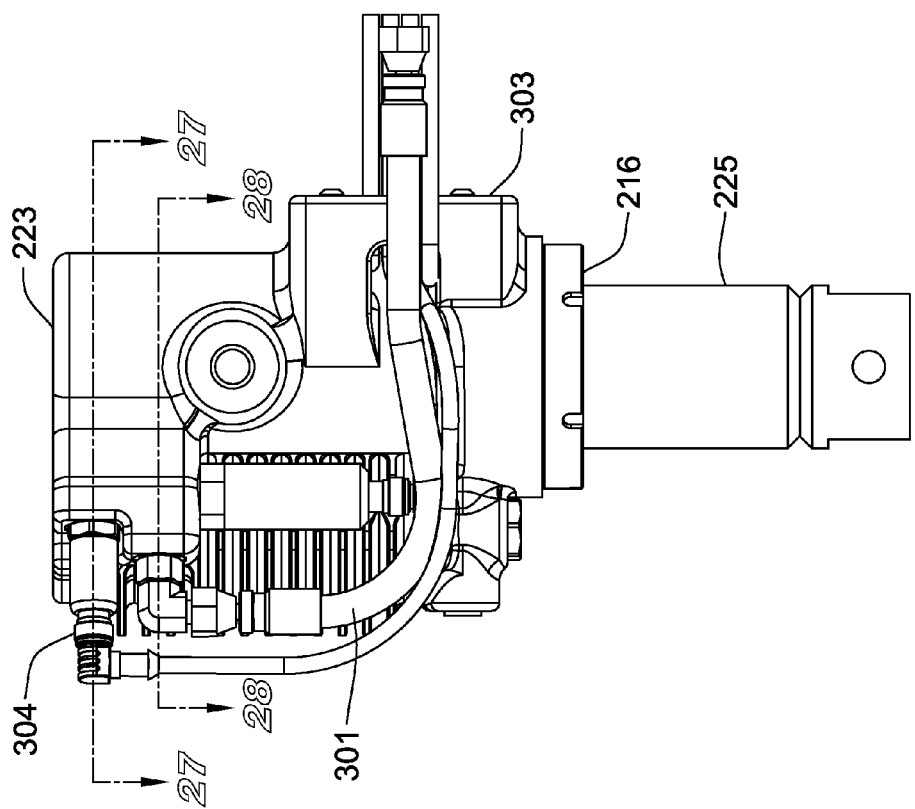
FIG. 25 is a side elevation of the right side of the control assembly shown in FIG. 23.
Figure 27:
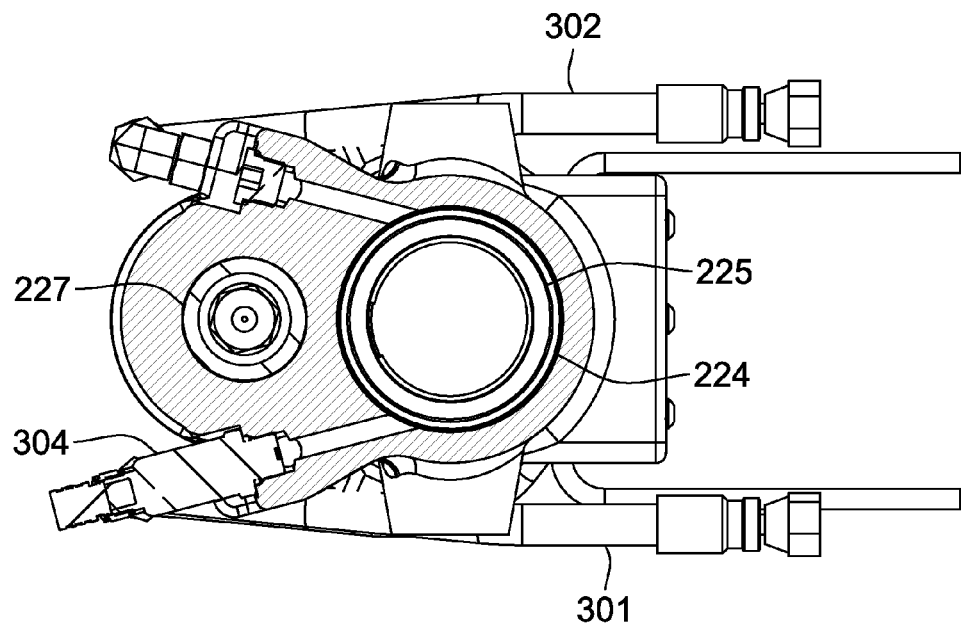
FIG. 27 is a section taken along line 22-22 in FIG. 25.
Figure 28:
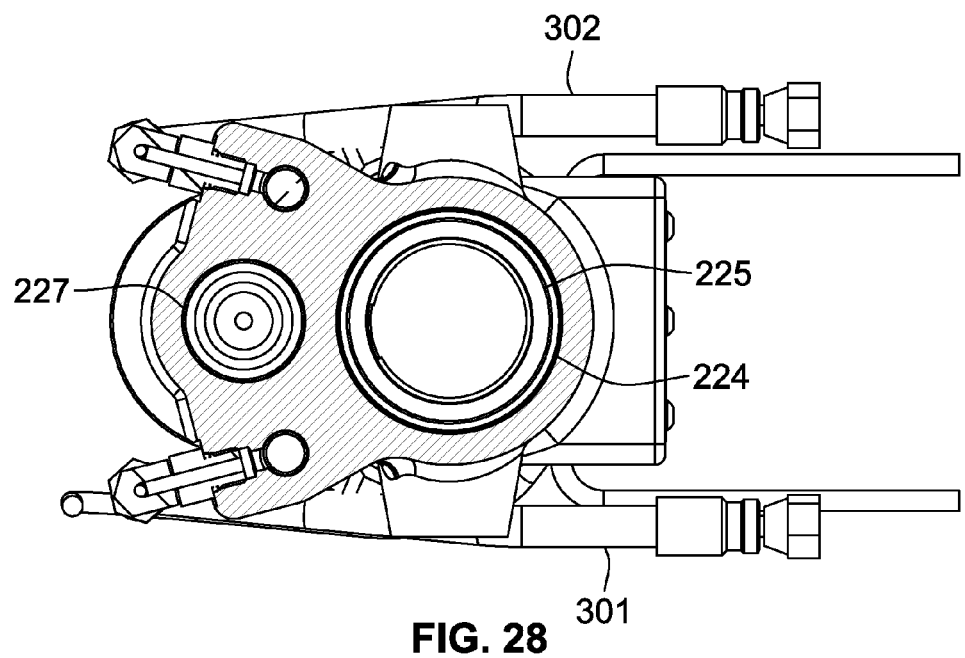
FIG. 28 is a section taken along line 23-23 in FIG. 25.
Figure 30:
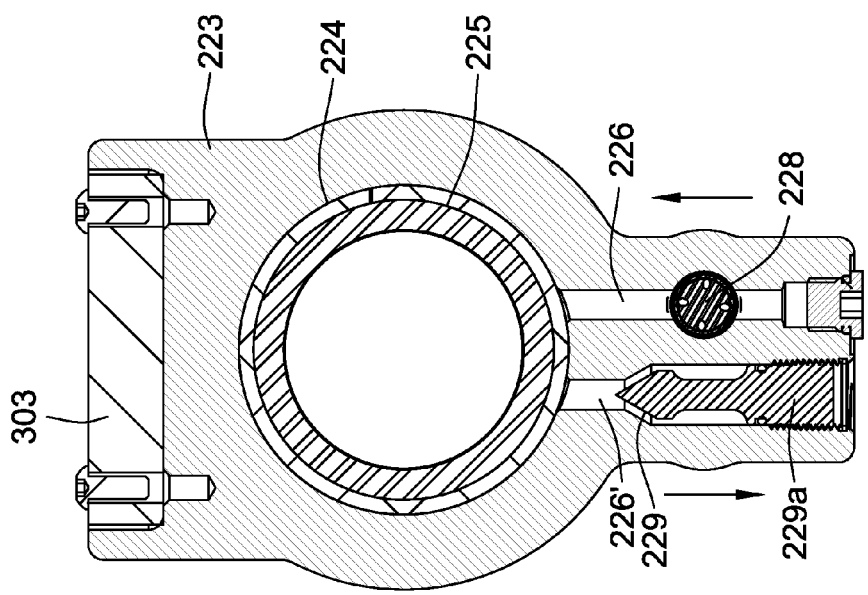
FIG. 30 is a horizontal section taken through the two ports shown in FIG. 29, with all the parts assembled.
Figure 29:
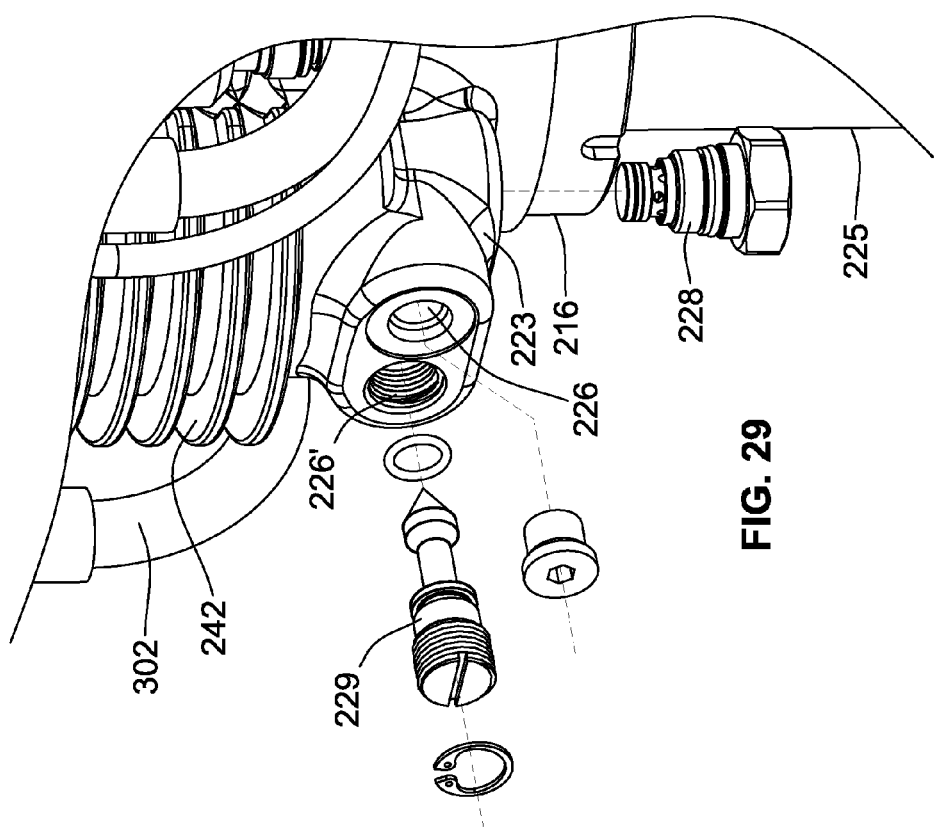
FIG. 29 is an enlarged exploded perspective of the central portion of the left side of the control assembly shown in FIG. 21.
Figure 31:
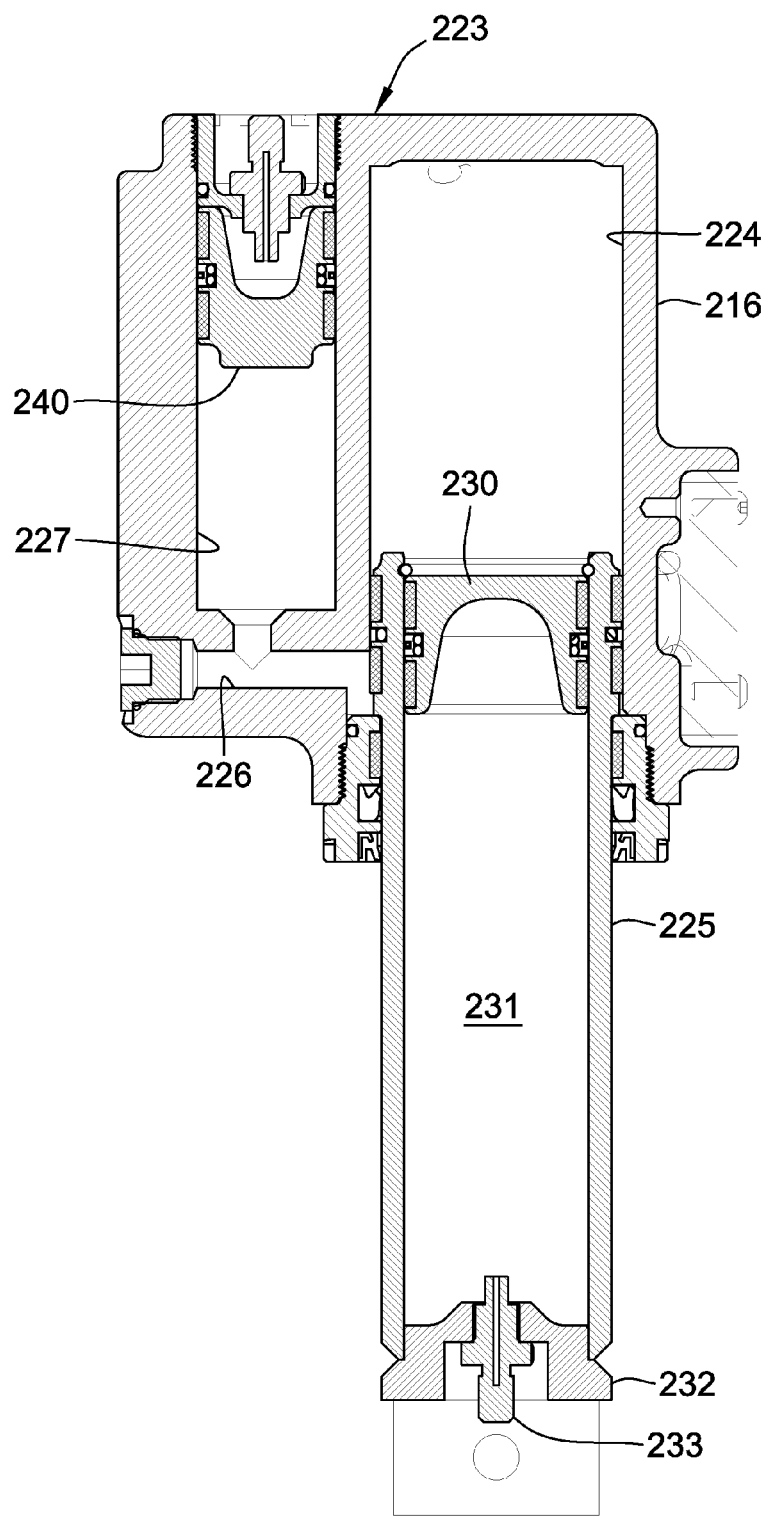
FIG. 31 is a vertical section taken through the middle of the control assembly shown in FIG. 7, with the rod of the hydraulic cylinder in its fully extended position.

FIG. 20 illustrates a planting row unit 210 that includes a furrow-opening device 211 for the purpose of planting seed or injecting fertilizer into the soil. A conventional elongated hollow towing frame (typically hitched to a tractor by a draw bar) is rigidly attached to the front frame 212 of a conventional four-bar linkage assembly 213 that is part of the row unit 210. The four-bar (sometimes referred to as "parallel-bar") linkage assembly 213 is a conventional and well known linkage used in agricultural implements to permit the raising and lowering of tools attached thereto.

As the planting row unit 210 is advanced by the tractor, the opening device 211 penetrates the soil to form a furrow or seed slot. Other portions of the row unit 210 then deposit seed in the seed slot and fertilizer adjacent to the seed slot, and close the seed slot by distributing loosened soil into the seed slot with a pair of closing wheels. A gauge wheel 214 determines the planting depth for the seed and the height of introduction of fertilizer, etc. Bins 215 on the row unit carry the chemicals and seed which are directed into the soil. The planting row unit 210 is urged downwardly against the soil by its own weight, and, in addition, a hydraulic cylinder 216 is coupled between the front frame 212 and the linkage assembly 213 to urge the row unit 210 downwardly with a controllable force that can be adjusted for different soil conditions. The hydraulic cylinder 216 may also be used to lift the row unit off the ground for transport by a heavier, stronger, fixed-height frame that is also used to transport large quantities of fertilizer for application via multiple row units.

The hydraulic cylinder 216 is shown in more detail in FIGS. 21-33. Pressurized hydraulic fluid from the tractor is supplied by a hose 301 to a port 304 that leads into a matching port of a unitary housing 223 that forms a cavity 224 of a hydraulic cylinder containing a hollow rod 225. The housing 223 also forms a side port 226 that leads into a second cavity 227 that contains hydraulic fluid that can be used to control the down pressure on the row unit, as described in more detail below.

The hydraulic control system includes a pair of controllable 2-way hydraulic lines 301 and 302 leading to the hydraulic cylinder in the unitary housing 223, which includes an integrated electronic controller 303. The hydraulic lines 301 and 302 are coupled to a pressure/inlet valve and a return outlet valve which are controlled by signals from the controller 303. The controller 303 receives input signals from a pressure transducer 304 that senses the pressure in the cavity 224, and a gauge wheel sensor that monitors the elevation of a tool relative to the elevation of the gauge wheel.

Slidably mounted within the hollow interior of the rod 225 is a down-pressure accumulator piston 230, which forms one end of a sealed chamber 231 containing pressurized gas that is part of the down-pressure accumulator. The lower end of the chamber 231 is sealed by a rod end cap 232 that contains a valve 233 for use in filling the chamber 231 with pressurized gas. Thus, the down-pressure accumulator is formed entirely within the hollow rod 225.

The hydraulic pressure exerted by the hydraulic fluid on the end surface of the rod 225 and the accumulator piston 230 urges the rod 225 downwardly, with a force determined by the pressure of the hydraulic fluid and the area of the exposed end surfaces of the rod 225 and the piston 230. The hydraulic fluid thus urges the rod 225, and thus the row unit, in a downward direction, toward the soil.

Figure 32:
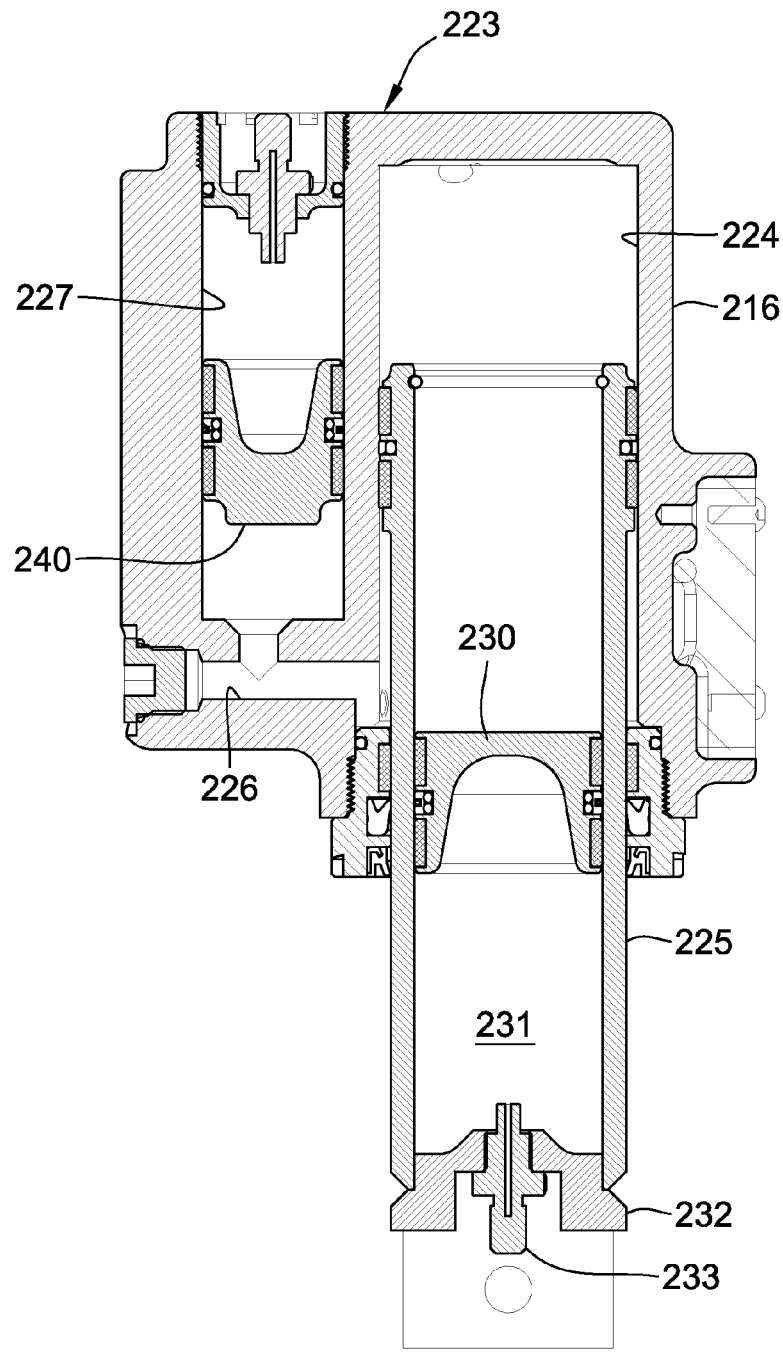
FIG. 32 is the same vertical section shown in FIG. 21, with the rod of the hydraulic cylinder in an intermediate position.
Figure 33:
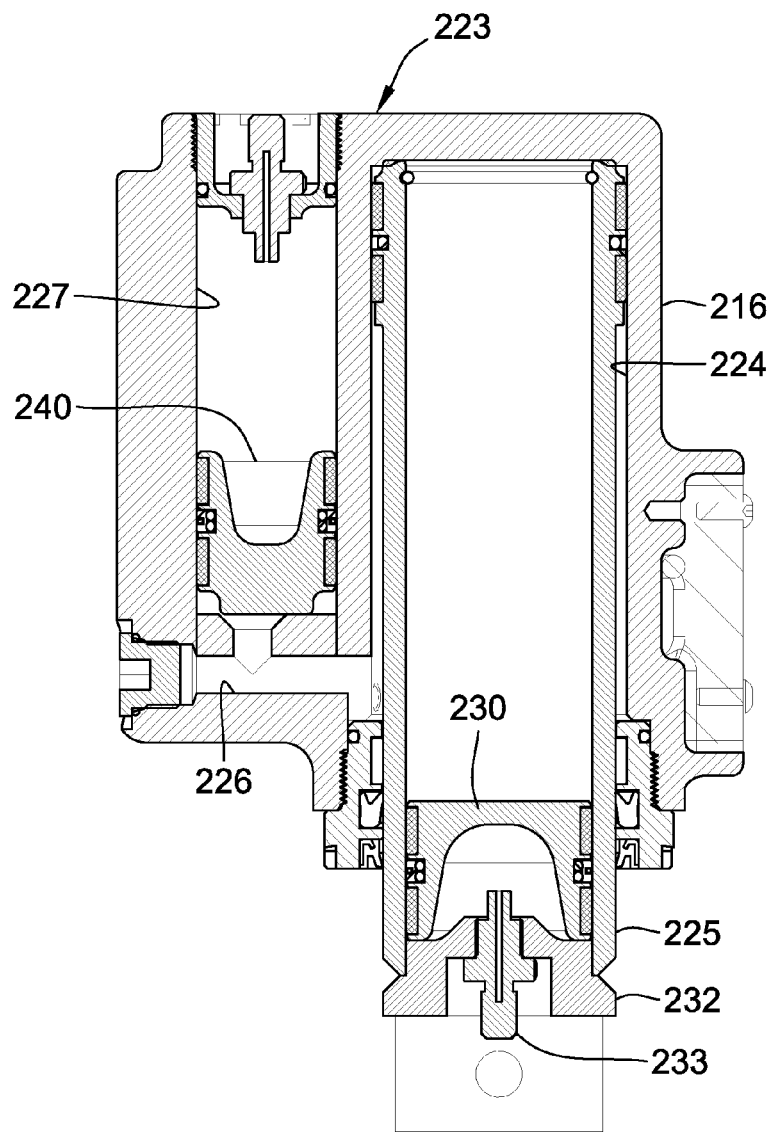
FIG. 33 is the same vertical section shown in FIG. 21, with the rod of the hydraulic cylinder in its fully retracted position.

When an upward force is exerted on the rod 225, such as when a rock or increased soil hardness is encountered, the rod 225 is moved upwardly within the cavity 224, as depicted in FIGS. 32 and 33. Because the cavity 224 is filled with pressurized hydraulic fluid in the cavity 224, the accumulator piston 230 does not move upwardly with the rod 225, as depicted in FIGS. 32 and 33. Thus, the pressurized gas between the accumulator piston 230 and the cap 232 at the lower end of the rod 225 is further compressed. This process continues as the rod 25 moves upwardly within the cavity 224, until the upper end of the rod engages the housing 216, as depicted in FIG. 33. In this fully retracted position of the rod 225, the accumulator piston 230 engages the end cap 232 on the lower end of the rod 225.

During upward movement of the rod 225 and downward movement of the accumulator piston 230, hydraulic fluid flows from the second cavity 227 through the conduit 226 into the space between the outer surface of the rod 225 and the wall of the cavity 224. The hydraulic fluid if urged in this direction by a second accumulator formed by a piston 240 and a charge of pressurized gas between the piston 240 and an end cap 241 that seals the top of the cavity 227. As can be seen in FIGS. 32 and 33, the compressed gas urges the piston 240 downwardly as the rod 225 moves upwardly, thus forcing hydraulic fluid from the cavity 227 through a check valve 228 into the increasing space between the outer surface of the rod 225 and the wall of the cavity 224. In FIG. 33, the rod 225 has been withdrawn to its most retracted position, and the accumulator piston 240 has moved to its lowermost position where it engages the bottom end wall of the cavity 227. At this point, the row unit is in its uppermost position.

The process is reversed when the rod 225 returns to its extended position, with the accumulators providing dynamic "rebound" damping during this return movement. As the rod 225 moves downwardly, hydraulic fluid is returned to the cavity 227 through a restriction 229 to damp the downward movement of the rod. The restriction 229 can be adjusted by turning the screw formed by the outer end portion of the tapered pin 229a that forms the restriction 229. The return flow rate of the hydraulic fluid is also affected by the pressure of the gas in the space above the accumulator piston 240, which must be overcome by the returning hydraulic fluid to move the piston 40 upwardly.

It will be appreciated that the system described above does not require any hydraulic fluid to flow into or out of the housing 223 during advancing and retracting movement of the rod 225 that controls the vertical position of the row unit relative to the soil. Thus, there is no need to open or close any valves to control the flow of hydraulic fluid in and out of the tractor reservoir of hydraulic fluid. This is not only more efficient than moving hydraulic fluid to and from the main reservoir, but also makes the operation of the row unit much smoother, which in turn improves the delivery of seed and/or fertilizer to the desired locations in the soil. The actuator assembly is normally closed with no fluid entering or leaving the actuator/accumulator assembly unless one or more valves are opened. There is also an advantage in using two valves because a 2-position, 1-way valve can be made fast-acting more readily that a 3-position, 2-way valve. Moreover, the computer controller can be directly integrated into the actuator assembly. The single double-acting actuator with two accumulators, one acting in the downward direction and one acting in the upward direction, can be mounted in the same location as previous actuators used on row units.

The present system has an accumulator on both sides of the actuator, with valves that control flow, not pressure, so that the actuator can become a totally closed system with no oil entering or leaving. The compensator design is linear because the piston accumulator is packaged within the inner diameter of the ram of a larger cylinder, which reduces the number of parts as well as the size of the actuator unit. The linear compensator design allows perfectly open and unrestricted flow of oil in the compression direction, which is advantageous because of the need to rapidly absorb energy when the row unit hits a rock or obstacle.

When the valves have a "latching" feature, the spools of the valves can be rapidly magnetized and demagnetized. This allows the valve to latch magnetically in either the open or closed condition so that the valve does not consume power continuously, as a typical proportional coil valve does. Moreover, the latching valve design takes advantage of the ability of the accumulators to allow the planter linkage to float up and down without requiring any gain or loss of fluid. Rather, the down pressure on the planter may be changed by holding either the pressure or return valve open for varying pulse width modulated durations to achieve a rise or drop in down pressure. These valves may have a very fast rate of change between open and closed conditions. If the valve changes state very quickly, typically less than 10 milliseconds, and requires no power to remain either open or closed, it is possible to achieve negligible power consumption system because the probability that any two valves will be in the process of opening or closing at the exact same time is very low.

Planter row units have varying unsprung weights (the portion of the planter row unit weight that is carried by the gauge wheels and not the frame). In some tillage and soil conditions which are very soft or prone to compaction, it can be advantageous to suspend some or all of this weight by pushing upward against it.

By pressurizing the uplift accumulator by filling gas through the gas valve, the gas pressure increases, pushing the piston accumulator against the fluid which is connected to the main cylinder by a fluid passageway. This pressure exerts an upward force on the smaller cross sectional area of the rod side of the main piston seals, and the gas pressure can be adjusted to change the amount of uplift force. It is also possible to have a gas pressure system that allows remote adjustment of the gas pressure. The fluid in the uplift circuit forms a closed system, and a manual or automatic flow control valve can be added between the main cylinder and the uplift accumulator to restrict flow, causing damping of the rebound cycle of the suspension cylinder.

Fluid is introduced into the cylinder by opening the pressure valve for some duration of time, allowing high-pressure fluid from the tractor to flow into the fluid chamber. This high-pressure fluid pushes against the linear compensator accumulator piston, which in turn compresses the gas to equalize the pressures on opposite sides of the piston. The accumulator piston will move back and forth inside the hollow rod when the down pressure is changing, even if the rod is not moving up and down. The length of time the pressure valve remains open corresponds to the size of the adjustment needed. Control is being accomplished in a closed loop fashion based on the planter gauge wheel load. Once the required pressure is achieved, the valve closes so that the actuator is a closed system again. The actuator can then allow the row unit to float up and down, compressing and decompressing the gas in the down-pressure and up-pressure accumulators. This will generate heat in the process—the heat is energy that is being damped from the system. To facilitate the removal of this heat from the system, the portion of the housing 223 that forms the cavity 227 forms multiple cooling fins 242 around its exterior surface.

Figure 34A:
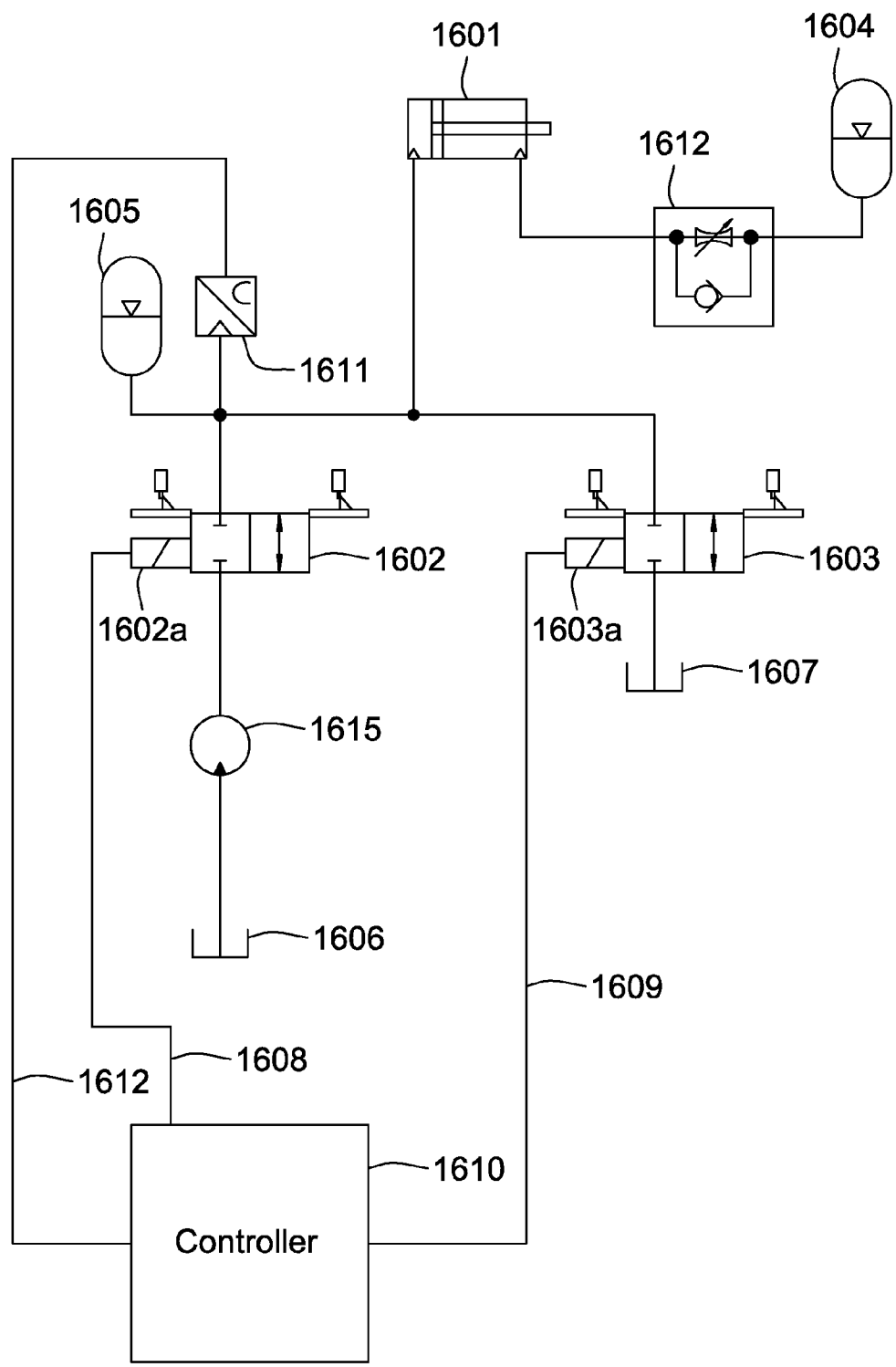
FIG. 34A is a schematic diagram of a hydraulic and electrical control system for use in the device of FIGS. 20-33 to provide rebound damping.

FIG. 34A is a schematic diagram of a hydraulic control system that uses a single hydraulic cylinder 1601, two two-position control valves 1602, 1603 and a pair of accumulators 1604, 1605. The valves are both latching type valves with a single actuator 1602a or 1603a for each valve, for moving the valve to either the open or closed position when the valve is unlatched. When valve 1602 is in the open position, it connects a source 1606 of pressurized hydraulic fluid to the hydraulic cylinder 1601 via pump 1607. When valve 1603 is open, it connects cylinder 1601 to a sump 1607. Electrical signals for energizing the actuators 1602a and 1603a are supplied to the respective actuators via lines 1607 and 1608 from a controller 1609, which in turn may be controlled by a central processor, if desired. The controller 1609 receives input signals from a pressure transducer 1610 coupled to the hydraulic cylinder 1601 via line 1611. The accumulator 1604 is coupled to the hydraulic cylinder 1601 through a valve 1612, as described in more detail below.

Figure 34B:
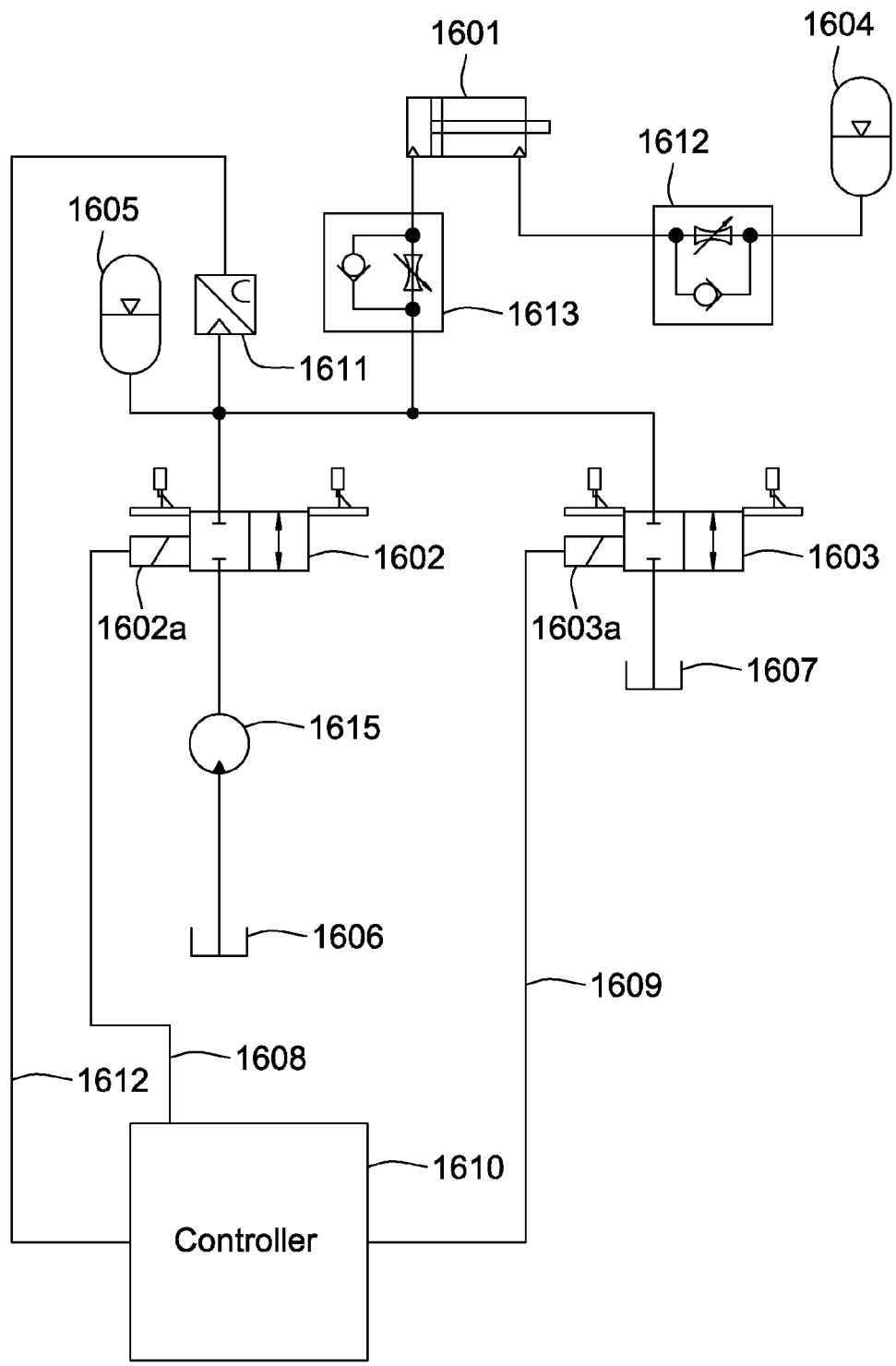
FIG. 34B is a schematic diagram of a modified hydraulic and electrical control system for use in the device of FIGS. 20-33 to provide both rebound and compression damping.

FIG. 34B is a schematic diagram of a modified version of the system of FIG. 34A to provide both rebound damping and compression damping. The only difference is that the system of FIG. 34B includes a valve 1613 between the accumulator 1603 and the compression side of the hydraulic cylinder 1601, so that the accumulator 1603 provides compression damping when the rod of the cylinder 1601 is moved from right to left in FIG. 34A.

Figure 35A:
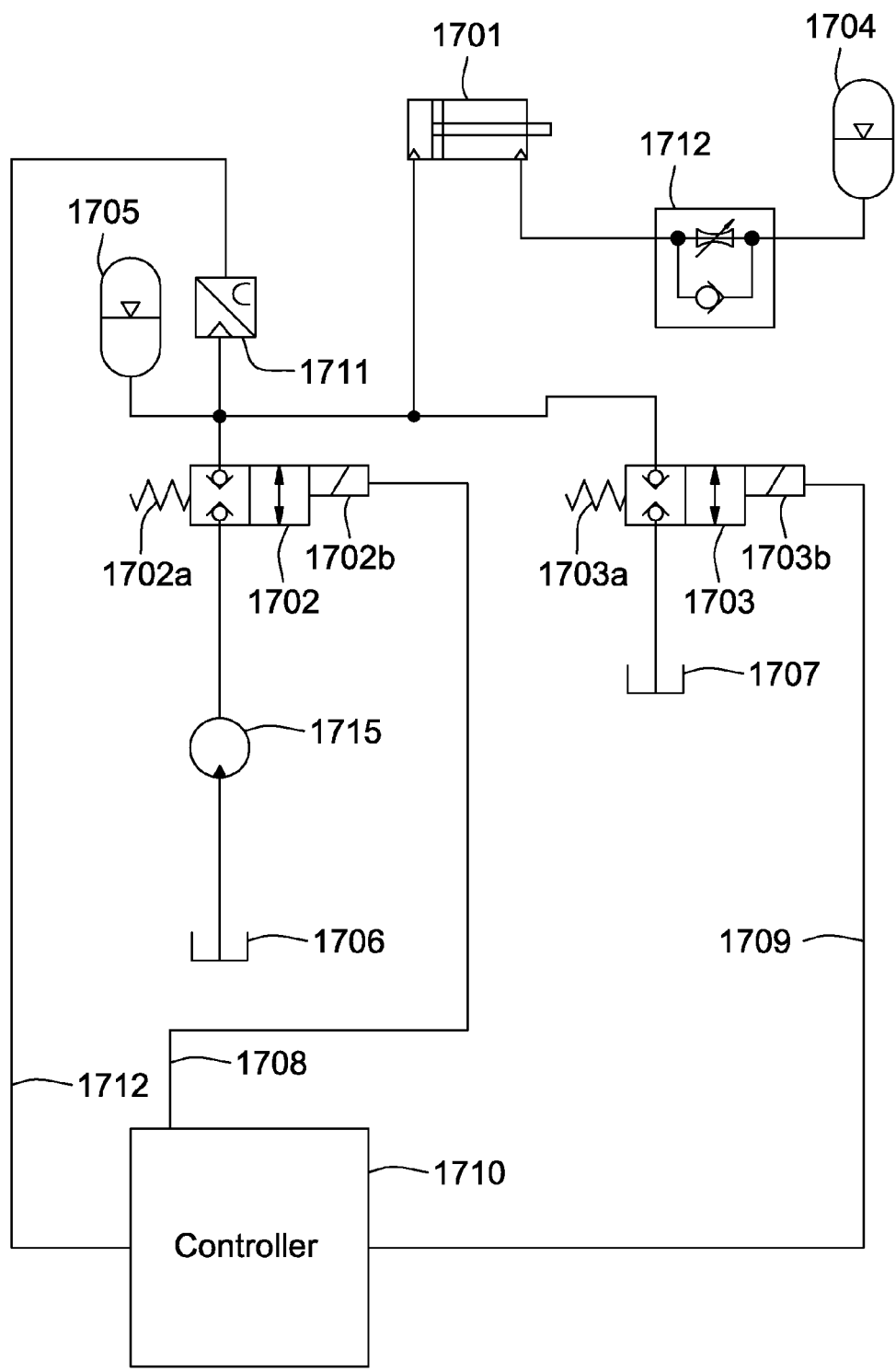
FIG. 35A is a schematic diagram of a modified hydraulic and electrical control system for use in the device of FIGS. 14-33 to provide rebound damping.
Figure 35B:
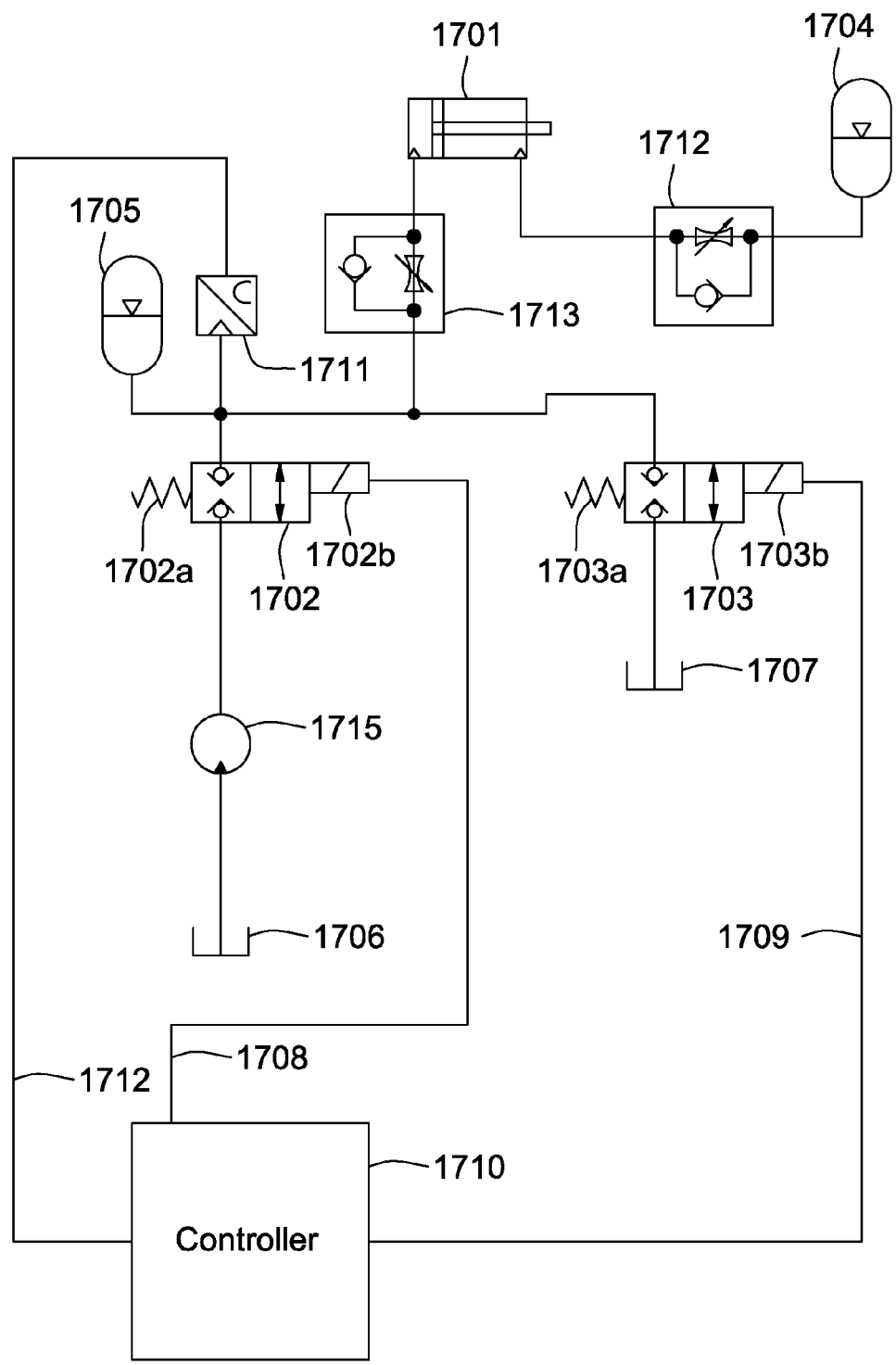
FIG. 35B is a schematic diagram of another modified hydraulic and electrical control system for use in the device of FIGS. 14-33 to provide both rebound and compression damping.

FIGS. 35A and 35B illustrate systems that are identical to those of FIGS. 34A and 15B, except that the latching valves are replaced with non-latching valves 1702 and 1703. These non-latching valves are biased toward their closed positions by respective springs 102a and 1703a, and can be moved to their open positions by energizing their respective actuators 1702b and 1703b.

Figure 36:
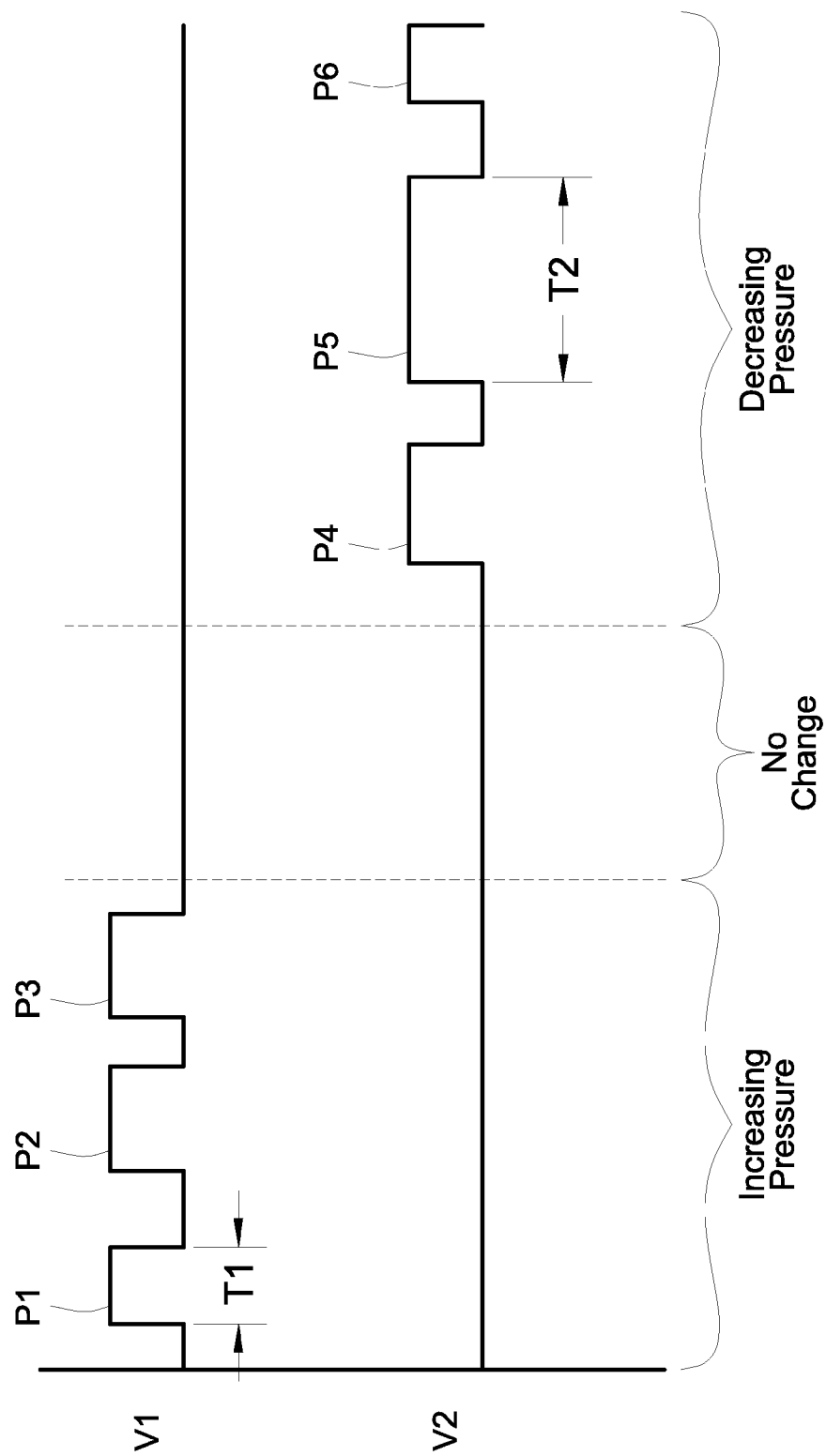
FIG. 36 is a waveform diagram illustrating different modes of operation provided by a PWM control system for the hydraulic valves in the system of FIG. 34B.

In the control system of FIG. 34B, a PWM control system may be used to supply short-duration pulses P to the actuators 1602a or 1603a of the control valves 1602 or 1603 to move the selected valve to its open position for short intervals corresponding to the widths of the PWM pulses. This significantly reduces the energy required to increase or decrease the pressure in the hydraulic cylinder 1601 for adjusting the down pressure on the soil-engaging implement. As depicted in FIG. 36, pulses P1-P3, having a voltage level V1, are supplied to the actuator 1602a when it is desired to increase the hydraulic pressure supplied to the hydraulic cylinder 1601. The first pulse P1 has a width T1 which is shorter than the width of pulses P2 and P3, so that the pressure increase is smaller than the increase that would be produced if P1 had the same width as pulses P2 and P3. Pulses P4-P6, which have a voltage level V2, are supplied to the actuator 1602a when it is desired to decrease the hydraulic pressure supplied to the hydraulic cylinder 1601. The first pulse P4 has a width that is shorter than the width T2 of pulses P2 and P3, so that the pressure decrease is smaller than the decrease that would be produced if P4 had the same width as pulses P5 and P6. When no pulses are supplied to either of the two actuators 1602a and 1603a, as in the "no change" interval in FIG. 36, the hydraulic pressure remains substantially constant in the hydraulic cylinder 1601.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

The invention claimed is:

1. A hydraulic control system for controlling the down force on an agricultural implement, comprising
   - a hydraulic cylinder containing a movable ram,
   - a source of pressurized fluid coupled to said hydraulic cylinder on a first side of said movable ram by a first controllable valve,
   - a fluid sump coupled to said hydraulic cylinder on said first side of said movable ram by a second controllable valve,
   - an electrical controller coupled to said first and second controllable valves for opening and closing said first and second controllable valves,
   - a pair of energy storage devices coupled to said hydraulic cylinder on opposite sides of said movable ram, and
   - a check valve coupling said hydraulic cylinder to said energy storage device.

2. The hydraulic control system of claim 1 which includes a second check valve coupling said hydraulic cylinder to said first and second controllable valves.

3. A hydraulic control system for controlling the down force on an agricultural implement, comprising
   - a hydraulic cylinder containing a movable ram,
   - a source of pressurized fluid coupled to said hydraulic cylinder on a first side of said movable ram by a first controllable valve,
   - a fluid sump coupled to said hydraulic cylinder on said first side of said movable ram by a second controllable valve, and
   - an electrical controller coupled to said first and second controllable valves for opening and closing said first and second controllable valves,
   - a pressure transducer coupled to said hydraulic cylinder on one side of said movable ram,
   - a down pressure controller for controlling the down pressure on at least a portion of the implement, and
   - a load sensor comprising
     - a mechanical element mounted for movement in response to the downward force applied to the implement,
     - a fluid-containing device containing a movable element coupled to said mechanical element for changing the fluid pressure in response to the movement of said mechanical element, and
     - a transducer coupled to said fluid-containing device for producing an output signal in response to changes in said fluid pressure.

4. The hydraulic control system of claim 3 which includes an energy storage device coupled to said fluid-containing device for receiving a limited amount of fluid in response to changes in said fluid pressure to damp pressure spikes in the output signal of said transducer.

5. The hydraulic control system of claim 4 in which said energy storage device is an accumulator receiving pressurized fluid from said fluid-containing device, said accumulator containing a movable element responsive to the pressure of the fluid received from said fluid-containing device.

* * * * *